US006909496B2

United States Patent
Mori

(10) Patent No.: US 6,909,496 B2
(45) Date of Patent: Jun. 21, 2005

(54) METHOD AND DEVICE FOR EASILY AND RAPIDLY MEASURING NONLINEAR REFRACTIVE INDEX OF OPTICAL FIBER

(75) Inventor: Takashi Mori, Atsugi (JP)

(73) Assignee: Anritsu Corporation, Tokyo (JP)

( * ) Notice: Subject to any disclaimer, the term of this patent is extended or adjusted under 35 U.S.C. 154(b) by 168 days.

(21) Appl. No.: 10/234,797

(22) Filed: Sep. 3, 2002

(65) Prior Publication Data

US 2003/0137652 A1 Jul. 24, 2003

(30) Foreign Application Priority Data

Dec. 25, 2001 (JP) ........................................ 2001-391847

(51) Int. Cl.[7] .............................................. G01N 21/00
(52) U.S. Cl. ...................................................... 356/73.1
(58) Field of Search ........ 356/73.1; 250/227.14–227.27; 385/123–128

(56) References Cited

U.S. PATENT DOCUMENTS

| 5,357,333 | A |   | 10/1994 | DeBernardi et al. |
| 5,457,576 | A |   | 10/1995 | Atkinson et al. |
| 5,661,554 | A |   | 8/1997 | Calvani et al. |
| 5,742,723 | A |   | 4/1998 | Onishi et al. |
| 5,774,217 | A | * | 6/1998 | Lee et al. .................... 356/517 |
| 6,081,632 | A | * | 6/2000 | Yoshimura et al. ............ 385/5 |
| 6,466,721 | B1 | * | 10/2002 | Tsukitani et al. ........... 385/127 |

FOREIGN PATENT DOCUMENTS

| EP | 0 548 935 A1 | 6/1993 |
| EP | 0 745 837 A2 | 12/1996 |
| JP | 8-285728 A | 11/1996 |

OTHER PUBLICATIONS

Y. Namihira et al; "Nonlinear Coefficient Measurements for Dispersion Shifted Fibres Using Self–Phase Modulation Method at 1.55μm"; Jul. 7, 1994; Electronics Letters vol. 30, No. 14, pp. 1171–1172.

L. Prigent et al; "Measurement of Fiber Nonlinear Kerr Coefficient by Four–Wave Mixing"; IEEE Photonics Technology Letters, vol. 5, No. 9, Sep. 1993; pp. 1092–1095.

* cited by examiner

*Primary Examiner*—Tu T. Nguyen
(74) *Attorney, Agent, or Firm*—Frishauf, Holtz, Goodman & Chick, P.C.

(57) ABSTRACT

A transmitting section makes light, intensity-modulated by a modulating signal of a sine wave having a designated frequency, be incident on one end side of an optical fiber which is a measurement object. A feature value determining section converts the light, which exits from another end side of the optical fiber, into an electric signal, and finds, from the electric signal, a predetermined feature value of a signal component having a frequency equal to the frequency of the modulating signal. A computing section obtains a nonlinear refractive index of the optical fiber to be measured from the predetermined feature value by calculation corresponding to the predetermined feature value based on a nonlinear Schroedinger (Schrödinger) equation.

20 Claims, 8 Drawing Sheets

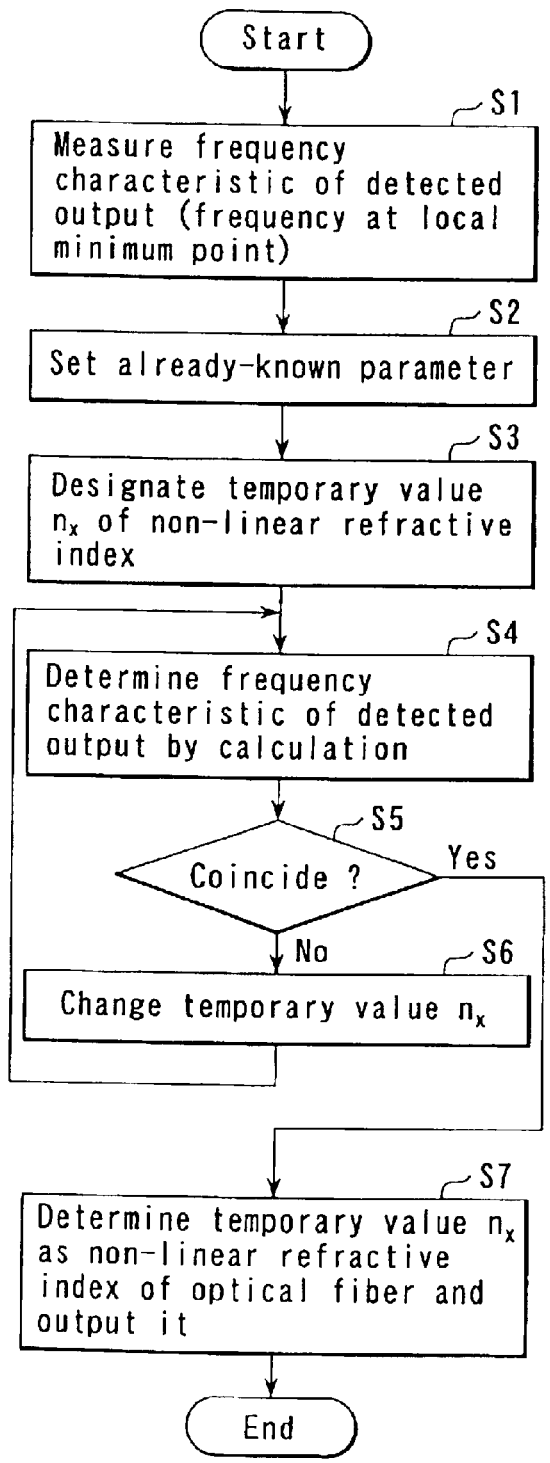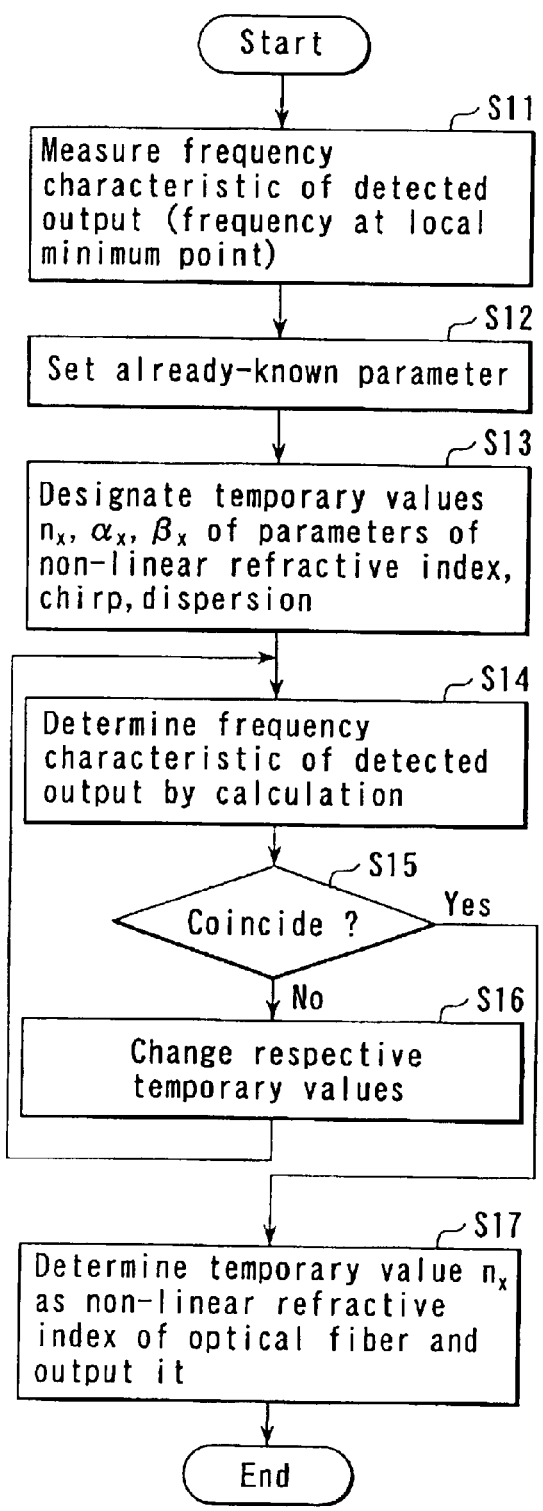
FIG. 8
FIG. 10

METHOD AND DEVICE FOR EASILY AND RAPIDLY MEASURING NONLINEAR REFRACTIVE INDEX OF OPTICAL FIBER

CROSS-REFERENCE TO RELATED APPLICATIONS

This application is based upon and claims the benefit of priority from the prior Japanese Patent Application No. 2001-391847, filed Dec. 25, 2001, the entire contents of which are incorporated herein by reference.

BACKGROUND OF THE INVENTION

1. Field of the Invention

The present invention relates to a method and device for measuring a nonlinear refractive index of an optical fiber, and in particular, to a method and device for measuring a nonlinear refractive index of an optical fiber which utilize a technique for rapidly measuring a nonlinear refractive index of an optical fiber with a simple structure.

2. Description of the Related Art

As is well known, an optical fiber is used as a transmission medium for transmitting light signals.

Because the optical fiber has a transmission loss in the same way as other transmission media, the longer the fiber length, the lower the strength of the light signal at the final end, the more the S/N deteriorates, and information cannot be accurately received. Therefore, there is the need to input a light signal having great strength at the inputting side.

However, the refractive index, which is an important factor determining the transmission characteristics of the optical fiber, exhibits dependency on the intensity of the light. The stronger the intensity of the light passing through, the more the refractive index increases.

This is called non-linearity of the refractive index of the optical fiber. The ratio of increase in the refractive index is called a nonlinear refractive index.

If light signal having great intensity is inputted to an optical fiber having a nonlinear refractive index, waveform distortion occurs in the light signal due to the nonlinear effect of refractive index. Adverse effects from the adjacent channel arise, and communication cannot be accurately carried out.

Accordingly, for example, when a communication system in which an optical fiber is the transmission medium is structured, there is the need to measure the nonlinear refractive index of the optical fiber in advance.

As a conventional method of measuring a nonlinear refractive index of an optical fiber, there are a method utilizing the self phase modulation effect of short pulse light, and a method utilizing the four-wave mixing effect by using two light sources.

The former method is a method in which short pulse light, whose strength is variable and which has a specific waveform, is incident on the optical fiber to be measured. The spectrum of the exiting light of the optical fiber is observed, and the inputting strength of the short pulse light is adjusted such that the number of peaks of the spectrum becomes a predetermined number. The peak power is determined by observing the time waveform of the short pulse light at this time. The nonlinear refractive index is determined on the basis of the peak power and the number of peaks of the spectrum.

Further, the latter method is a method in which two continuous lights having different frequencies (wavelengths) are merged and inputted to one end side of the optical fiber. The spectrum of exiting light of the optical fiber is observed. The ratio of the power of the two continuous lights and the power of two frequencies arising due to the four-wave mixing effect thereof is measured. The nonlinear refractive index is determined on the basis of the strength of inputted light and the power ratio.

However, there is the problems that, in the former measuring method, the measurement error becomes large by being affected by the frequency chirp (the change in frequency at the rise or fall of the pulse) or by the chromatic dispersion of the optical fiber, and in the latter measuring method as well, the measurement error becomes large by being affected by the chromatic dispersion of the optical fiber.

As a technique for solving this problem, for example, in Jpn. Pat. Appln. KOKAI Publication No. 8-285728, as shown in FIG. 18, a measuring method is proposed in which a nonlinear refractive index, in which the calculated result and the measured result sufficiently and precisely coincide, is determined by repeating, while changing a temporary value, a processing in which pulse light is incident on an optical fiber 1 which is a measuring object from a pulse light source 10, this incident light and the time waveform and frequency chirp characteristic of the exiting light of the optical fiber 1 are respectively measured by a time waveform measuring section 11 and a frequency chirp measuring section 12, the time waveform and the frequency chirp characteristic of the incident light are calculated in a calculating section 13 by numerical calculation of split-step Fourier method based on a nonlinear Schroedinger (Schrödinger) equation by using the time waveform obtained by measuring the incident light, the frequency chirp characteristic, known data of the optical fiber, and a temporary value of the nonlinear refractive index, and the calculated result and the actual measured result of the exiting light are compared.

However, in the above-described method disclosed in Jpn. Pat Appln. KOKAI Publication No. 8-285728, there is the need to precisely measure the time waveform, the frequency response characteristic chirp, and the power of the pulse light used as the measuring light. Therefore, there is the problem that an extremely high-speed light receiving device and a measuring circuit are necessary, and the device becomes expensive and large scale.

Further, in the above-described method disclosed in the Jpn. Pat. Appln. KOKAI Publication No. 8-285728, in the numerical calculation by the nonlinear Schroedinger equation for the pulse light, the calculating amount is great. Thus, there is the problem that the measured result cannot be rapidly obtained.

BRIEF SUMMARY OF THE INVENTION

An object of the present invention is to provide a method of measuring a nonlinear refractive index of an optical fiber which solves the above-described problems and can rapidly obtain a measured result with a simple structure.

Another object of the present invention is to provide a device for measuring a nonlinear refractive index of an optical fiber which solves the above-described problems and can rapidly obtain a measured result with a simple structure.

In order to achieve the above object, according to a first aspect of the present invention, there is provided a method of measuring a nonlinear refractive index of an optical fiber comprising:

inputting light intensity-modulated by a modulation signal of a sine wave having a designated frequency to one end side of an optical fiber which is a measurement object;

converting the light which is incident on the one end side of the optical fiber which is the measurement object and exits from the other end side of the optical fiber which is the measurement object into an electric signal, and finding, from the electric signal, a predetermined feature value of a signal component having a frequency equal to the frequency of the modulation signal; and obtaining a nonlinear refractive index of the optical fiber which is the measurement object from the predetermined feature value by calculation based on a nonlinear Schroedinger equation.

According to a second aspect of the present invention, there is provided a method of measuring a nonlinear refractive index of an optical fiber according to the first aspect, wherein the finding includes measuring a frequency response characteristic of the signal component as the predetermined feature value.

According to a third aspect of the present invention, there is provided a method of measuring a nonlinear refractive index of an optical fiber according to the first aspect, wherein the finding includes measuring, as the predetermined feature value, an amplitude value of the signal component at a predetermined frequency or a frequency at which the amplitude value of the signal component becomes a local minimum.

According to a fourth aspect of the present invention, there is provided a method of measuring a nonlinear refractive index of an optical fiber according to the second aspect, wherein the obtaining includes:

determining coincidence of the predetermined feature value and a feature value, in calculation corresponding to the predetermined feature value, which is obtained by successively changing a temporary value of the nonlinear refractive index of the optical fiber which is the measurement object and by giving it to a nonlinear Schroedinger equation.

According to a fifth aspect of the present invention, there is provided a method of measuring a nonlinear refractive index of an optical fiber according to the third aspect, wherein the obtaining includes:

first computing the predetermined feature value of the signal component on the basis of the nonlinear Schroedinger equation for values of several nonlinear refractive indices;

preparing a table showing the relationship between the several nonlinear refractive indices and the predetermined feature value of the signal component by the computing; and second computing the nonlinear refractive index of the optical fiber which is the measurement object by interpolating or extrapolating a value of the table by the preparing by using the predetermined feature value of the signal component by the finding.

According to a sixth aspect of the present invention, there is provided a method of measuring a nonlinear refractive index of an optical fiber according to the third aspect, wherein the preparing prepares the relationships between the several nonlinear refractive indices and the predetermined value of the signal component into tables with respect to several chromatic dispersion values of optical fibers, and is capable of corresponding to optical fibers having various chromatic dispersion values by computing the nonlinear refractive index of the optical fiber which is the measurement object by interpolating or extrapolating tables by the chromatic dispersion value of the optical fiber which is the measurement object.

According to a seventh aspect of the present invention, there is provided a method of measuring a nonlinear refractive index of an optical fiber according to the third aspect, further comprising:

between the inputting and the converting, controlling chromatic dispersion to become a chromatic dispersion value appropriate for the finding the predetermined feature value for the light which is incident on the one end side of the optical fiber which is the measurement object and exits from the other end side of the optical fiber which is the measurement object.

According to an eighth aspect of the present invention, there is provided a method of measuring a nonlinear refractive index of an optical fiber according to the first aspect, wherein the inputting includes applying phase modulation to the light which is to be incident on the one end side of the optical fiber which is the measurement object, before or after intensity modulation by the modulation signal of the sine wave.

According to a ninth aspect of the present invention, there is provided a method of measuring a nonlinear refractive index of an optical fiber according to the seventh aspect, wherein the inputting includes applying phase modulation to the light which is to be incident on the one end side of the optical fiber which is the measurement object, before or after intensity modulation by the modulation signal of the sine wave.

According to a tenth aspect of the present invention, there is provided a method of measuring a nonlinear refractive index of an optical fiber according to the first aspect, wherein the obtaining includes performing small signal approximation with respect to the modulation signal of the sine wave.

In order to achieve the another object, according to an eleventh aspect of the present invention, there is provided a device for measuring a nonlinear refractive index of an optical fiber comprising:

a light transmitting section which makes light, intensity-modulated by a modulating signal of a sine wave having a designated frequency, incident on one end side of an optical fiber which is a measurement object;

a feature value determining section which converts the light, which is incident on one end side of the optical fiber which is the measurement object and exits from another end side of the optical fiber which is the measurement object, into an electric signal, and finds, from the electric signal, a predetermined feature value of a signal component having a frequency equal to the frequency of the modulation signal; and a computing section which obtains a nonlinear refractive index of the optical fiber which is the measurement object from the predetermined feature value by calculation based on a nonlinear Schroedinger equation.

According to a twelfth aspect of the present invention, there is provided a device for measuring a nonlinear refractive index of an optical fiber according to the eleventh aspect, wherein the feature value determining section includes a frequency response characteristic measuring section which measures a frequency response characteristic of the signal component as the predetermined feature value.

According to a thirteenth aspect of the present invention, there is provided a device for measuring a nonlinear refractive index of an optical fiber according to the eleventh aspect, wherein the feature value determining section includes a frequency response characteristic measuring section which measures, as the predetermined feature value, an amplitude value of the signal component at a predetermined frequency or a frequency at which the amplitude value of the signal component becomes a local minimum.

According to a fourteenth aspect of the present invention, there is provided a device for measuring a nonlinear refractive index of an optical fiber according to the twelfth aspect, wherein the computing section determines coincidence of the predetermined feature value found by the feature value determining section and a feature value, in calculation corresponding to the predetermined feature value, which is obtained by successively changing a temporary value of the nonlinear refractive index of the optical fiber which is the measurement object and by giving it to a nonlinear Schroedinger equation.

According to a fifteenth aspect of the present invention, there is provided a device for measuring a nonlinear refractive index of an optical fiber according to the thirteenth aspect, wherein the computing section first computes the predetermined feature value of the signal component on the basis of the nonlinear Schroedinger equation for values of several nonlinear refractive indices, prepares a table showing the relationship between the computed several nonlinear refractive indices and the predetermined feature value of the signal component, and second computes the nonlinear refractive index of the optical fiber which is the measurement object by interpolating or extrapolating the value of the table by using the predetermined feature value of the signal component measured by the feature value determining section.

According to a sixteenth aspect of the present invention, there is provided a device for measuring a nonlinear refractive index of an optical fiber according to the thirteenth aspect, wherein the table is prepared for the relationships between the several nonlinear refractive indices and the predetermined value of the signal component with respect to several chromatic dispersion values of optical fibers, and is capable of corresponding to optical fibers having various chromatic dispersion values by computing the nonlinear refractive index of the optical fiber which is the measurement object by interpolating or extrapolating tables by the chromatic dispersion value of the optical fiber which is the measurement object.

According to a seventh aspect of the present invention, there is provided a device for measuring a nonlinear refractive index of an optical fiber according to the thirteenth aspect, further comprising:

a dispersion controlling section which controls chromatic dispersion to become chromatic dispersion value appropriate for the predetermined feature value for the light exiting from the other end side of the optical fiber which is the measurement object.

According to an eighth aspect of the present invention, there is provided a device for measuring a nonlinear refractive index of an optical fiber according to the eleventh aspect, wherein the light transmitting section includes a phase modulating section which applies phase modulation to the light which is to be incident on the one end side of the optical fiber which is the measurement object, before or after intensity modulation by the modulation signal of the sine wave.

According to a nineteenth aspect of the present invention, there is provided a device for measuring a nonlinear refractive index of an optical fiber according to the seventeenth aspect, wherein the light transmitting section includes a phase modulating section which applies phase modulation to the light which is to be incident on the one end side of the optical fiber which is the measurement object, before or after intensity modulation by the modulation signal of the sine wave.

According to a twentieth aspect of the present invention, there is provided a device for measuring a nonlinear refractive index of an optical fiber according to the eleventh aspect, wherein the computing section performs small signal approximation with respect to the modulating signal of the sine wave.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 8 is a flowchart showing processing procedures of a calculating section for explaining operation of the device for measuring a nonlinear refractive index of an optical fiber according to the first embodiment of the present invention;

FIG. 10 is a flowchart showing processing procedures of the calculating section for explaining operation of the device for measuring a nonlinear refractive index of an optical fiber according to the first embodiment of the present invention;

DETAILED DESCRIPTION OF THE INVENTION

Figure 1:
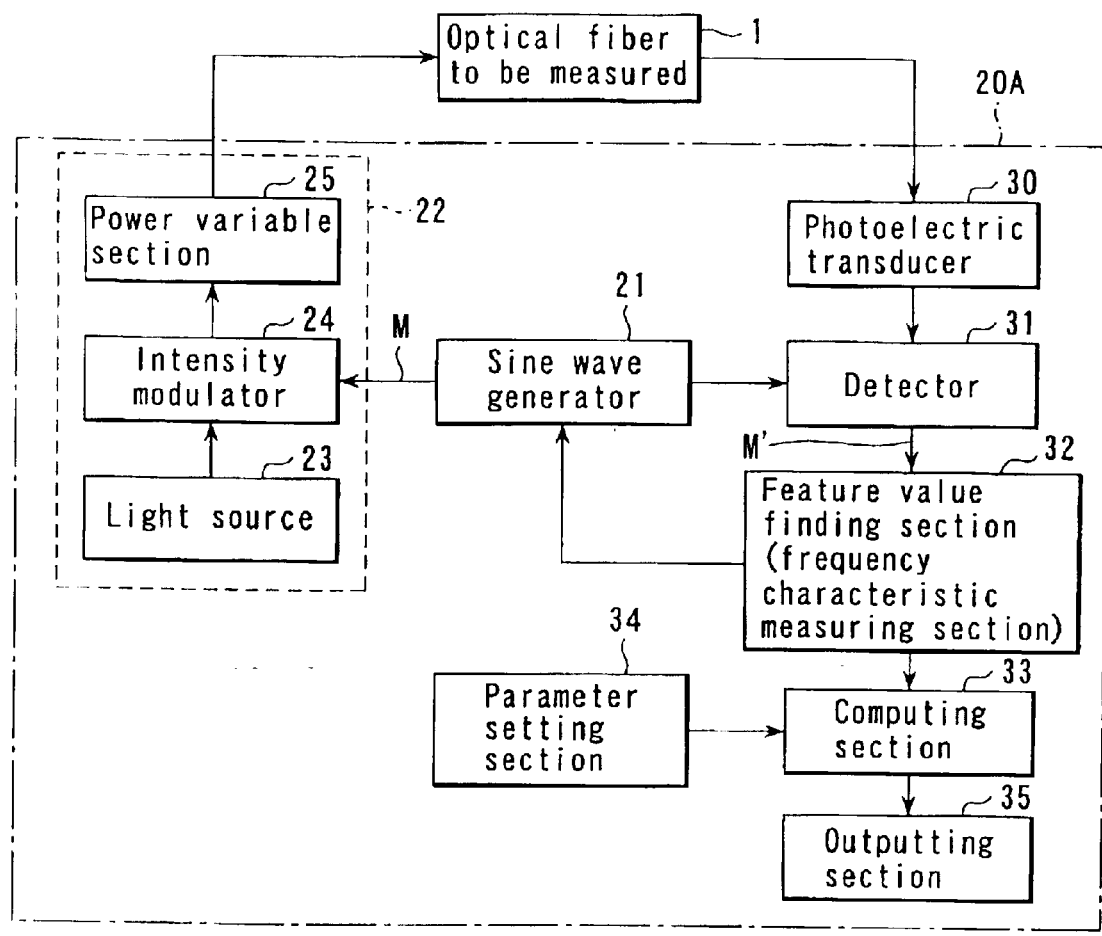
FIG. 1 is a block diagram showing a structure of a device for measuring a nonlinear refractive index of an optical fiber according to a first embodiment of the present invention.

Reference will now be made in detail to the presently preferred embodiments of the invention as illustrated in the accompanying drawings, in which like reference numerals designate like or corresponding parts.

Hereinafter, embodiments of the present invention will be described with reference to the figures.

(First Embodiment)

FIG. 1 is a block diagram showing a structure of a device 20A for measuring a nonlinear refractive index of an optical fiber according to a first embodiment of the present invention.

In FIG. 1, a sine-wave generator 21 is a frequency-variable sine-wave generator, and outputs, as a modulation signal M, a sine wave having a predetermined frequency and a predetermined amplitude corresponding to a designation from an operating section (not shown) or a feature value determining section 32.

A light transmitting section 22 is structured such that intensity modulation can be carried out at a predetermined wavelength by the modulation signal which is the sine wave signal from the sine-wave generator 21, and light whose overall intensity (average power) can be varied is outputted.

Concretely, the light transmitting section 22 is structured from a light source 23 such as laser diode for outputting continuous light having a predetermined wavelength, an intensity modulator 24 for intensity-modulating outputted light from the light source 23 at a modulation factor m by the modulation signal M outputted from the sine-wave generator 21, and a power variable section 25 for varying the power (average power) of the light outputted from the intensity modulator 24.

Figure 2:
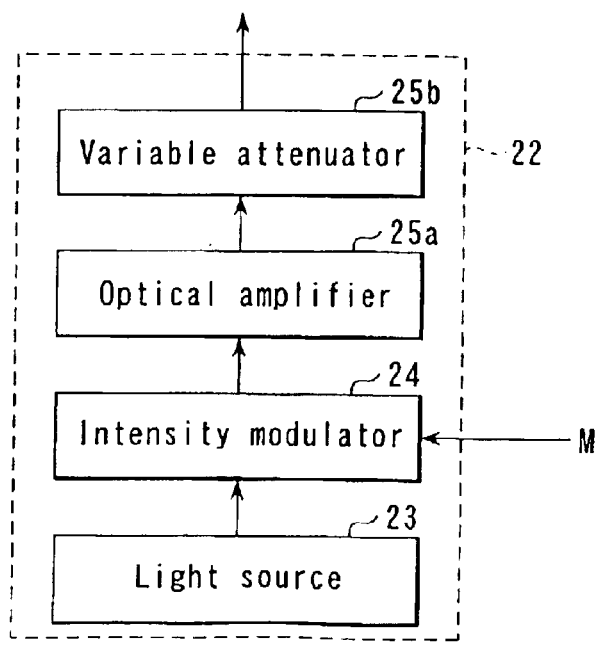
FIG. 2 is a block diagram showing a structural example of a main portion of FIG. 1.
Figures 3, 4:
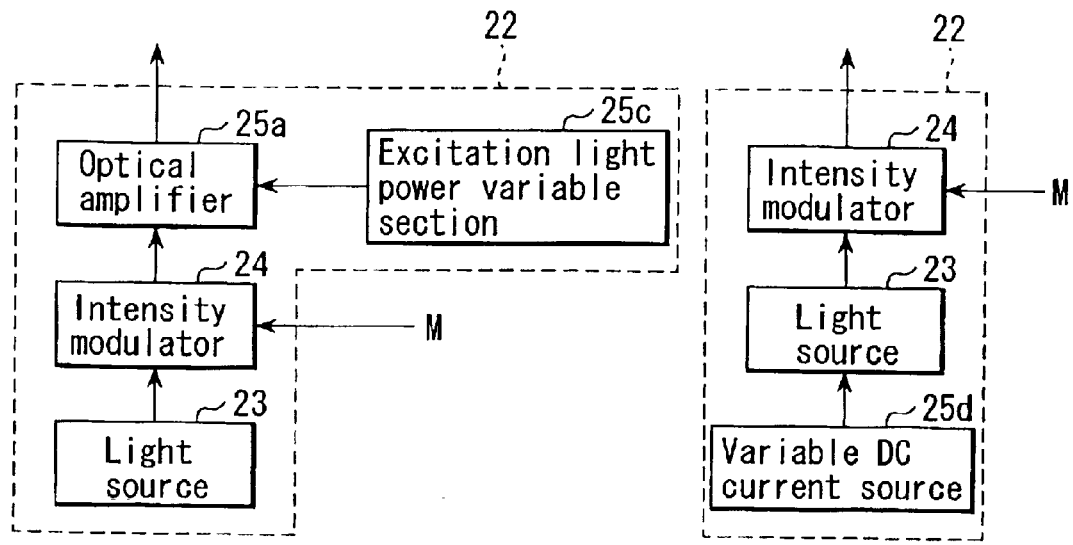
FIG. 3 is a block diagram showing a structural example of a main portion of FIG. 1.
FIG. 4 is a block diagram showing a structural example of a main portion of FIG. 1.

Note that the power variable section 25 of the light transmitting section 22 may be, for example, any of a structure in which the power of light amplified by an optical amplifier 25a is attenuated by a variable optical attenuator 25b as shown in FIG. 2, or a structure in which the power of excitation light determining the amplification degree of the light amplifier 25a is varied by excitation light power variable means 25c as shown in FIG. 3, or a structure in which the DC power of the light source 23 is varied by the a variable DC current source 25d.

Further, the light transmitting section 22 may carry out intensity modulation by directly giving the modulation signal M to the light source 23, or can combine the direct modulation with the power variable means of FIG. 2 or FIG. 4.

The light outputted from the light transmitting section 22 is incident on one end side of an optical fiber 1 which is a measuring object via an unillustrated connector or the like.

Note that the power of the light incident on the optical fiber 1 must be known already in order to use it for computation described later. In advance, the power outputted from the light transmitting section 22 is calibrated, or is always monitored by an optical power meter 27 via an optical coupler 26 as shown in FIG. 5 (the loss of the optical coupler 26 as well is considered).

Figures 5, 6:
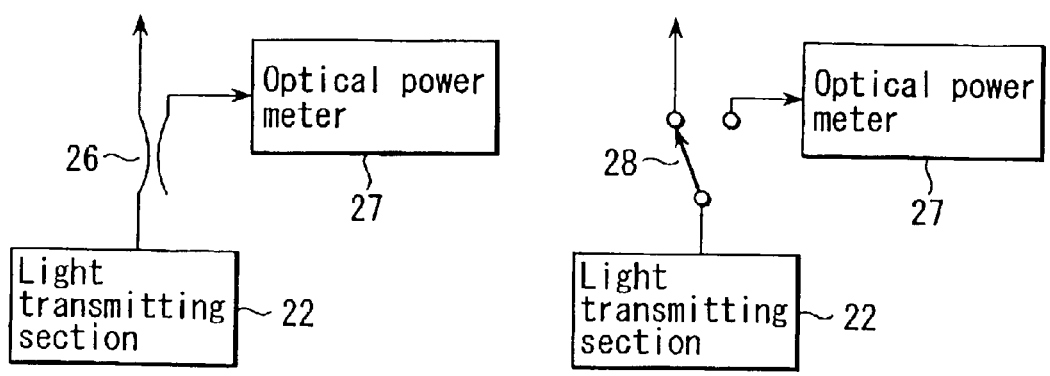
FIG. 5 is a block diagram showing a structural example of a main portion of FIG. 1.
FIG. 6 is a block diagram showing a structural example of a main portion of FIG. 1.

Alternatively, as shown in FIG. 6, the power outputted from the light transmitting section 22 may be measured by the optical power meter 27 via a light switch 28.

Further, the modulation factor m, determined by the amplitude of the sine wave outputted from the sine-wave generator 21 and the modulation characteristic of the intensity modulator 24, is already known in this example.

However, as described later, the modulation factor m and the measured result may be unrelated depending on the conditions, and the modulation factor m does not have to be already known.

The light outputted from the other end side of the optical fiber 1 is incident on a photoelectric transducer 30 via an unillustrated connector or the like.

The photoelectric transducer 30 is formed from a photodiode or the like corresponding to the wavelength of the light outputted from the light transmitting section 22, and outputs to a detector 31 electric signal whose voltage changes in proportion to the power of the incident light.

The detector 31 has a frequency selective function of changing the selected frequency interlockingly with the frequency of the modulation signal M outputted from the sine wave generator 21, and extracts only the frequency component equal to the frequency of the modulation signal M from the signal outputted from the photoelectric transducer 30, and detects the amplitude of this extracted signal and outputs it as a detected signal M'.

If the frequency response characteristic is used as a feature value, the frequency response characteristic measuring section 32 serving as a feature value determining section sweeps the frequency of the modulation signal M outputted from the sine wave generator 21 while receiving the output of the detector 31, and measures the amplitude value of the extracted signal for each frequency, namely, the frequency response characteristic of the detected signal M'.

Note that, here, a case in which the frequency response characteristic measuring section 32 serving as the feature value determining section controls the frequency of the modulation signal M outputted from the sine-wave generator 21 will be described. However, this frequency controlling function may be provided in the sine wave generator 21 itself, and the frequency response characteristic measuring section 32 serving as the feature value determining section receives the frequency information outputted from the sine wave generator 21, so that the frequency response characteristic of the detected signal M' can be determined.

Further, in the following description, a case will be described in which the frequency response characteristic measuring section 32 determines, as a feature value of the frequency response characteristic, the frequency at the local minimum point at which the amplitude value of the detected signal M' becomes a local minimum as a predetermined feature value. However, it may be that a characteristic of the overall change in the amplitude value is determined as the frequency response characteristic of the detected signal M' in a frequency variable range of the modulation signal M, or an amplitude value of one frequency or more other than the local minimum point is determined as a predetermined feature value on the frequency response characteristic.

Further, the above-described sine wave generator 21, detector 31, and frequency response characteristic measuring section 32 serving as the feature value determining section can be substituted by a network analyzer integrally having these functions.

Figure 7:
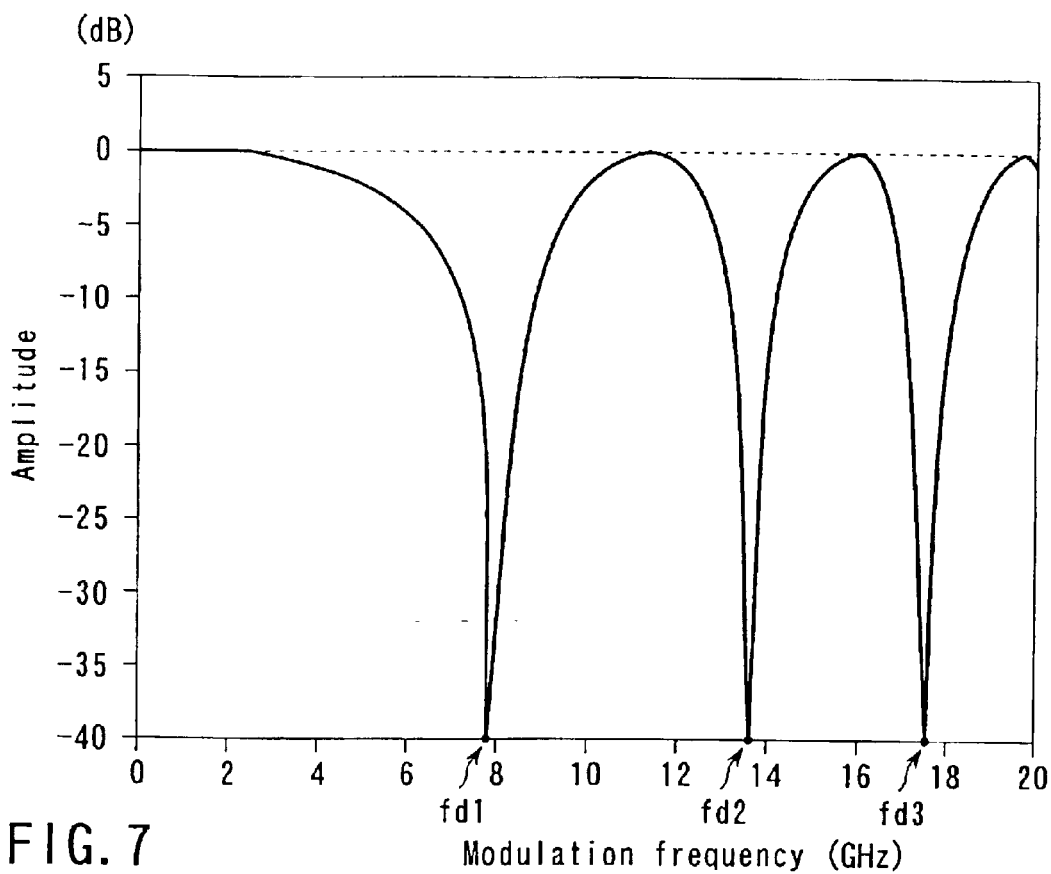
FIG. 7 is a graph illustrating a frequency response characteristic of an extracted signal shown for explaining operation of the device for measuring a nonlinear refractive index of an optical fiber according to the first embodiment of the present invention.

In this way, if the frequency response characteristic of the detected signal M' is measured in a state in which light incident on the optical fiber 1 having enough power to be measured, for example, as shown in FIG. 7, the local minimum point, at which the amplitude value of the detected signal M' greatly decreases and becomes a local minimum, appears at frequencies $fd_1$, $fd_2$, $fd_3$, . . . (depending on the range of the modulating frequency, there are cases in which there is are plural local minimum points).

Such a frequency response characteristic having local minimum points changes due to the influence of a chromatic dispersion value and a nonlinear refractive index of the optical fiber 1 to be measured, and of the power and the frequency chirp of the incident light.

Accordingly, assuming that the chromatic dispersion value of the optical fiber 1 to be measured, and the power and the frequency chirp of the incident light are already known, and the frequency response characteristic (the above predetermined feature value) of the detected signal M', with respect to an arbitrary nonlinear refractive index, can be determined by calculation. When a frequency response characteristic (the above predetermined feature value) obtained by the calculation and a frequency response characteristic (the above predetermined feature value) obtained by actual measurement are coincide, it can be considered that the nonlinear refractive index used in the calculation is equal to the nonlinear refractive index of the optical fiber 1 to be measured.

A computing section 33 calculates the frequency response characteristic (the above predetermined feature value) of the detected signal M' on the basis of the nonlinear Schroedinger equation by using already-known parameters set from a parameter setting section 34 and an initial value of a temporary value of the nonlinear refractive index, and determines whether or not the frequency response characteristic (the above predetermined feature value) determined in the calculation and the frequency response characteristic (the above predetermined feature value) obtained by an actual measurement coincide in a predetermined range. When they do not coincide, an operation, in which the frequency response characteristic (the above predetermined feature value) is calculated by changing the temporary value of the nonlinear refractive index and determination is carried out again, is repeated. The temporary value of the nonlinear refractive index when the frequency response characteristic (the above predetermined feature value) obtained by the calculation and the frequency response characteristic (the above predetermined feature value) obtained by actual measurement coincide is determined to be the nonlinear refractive index of the optical fiber 1 to be measured, and is outputted to an outputting section 35 structured by a display device or the like.

Here, as described above, the predetermined feature value on the frequency response characteristic of the detected signal M' is the frequency at the local minimum point.

Next, computing processing which the computing section 33 carries out will be described.

Firstly, the solution of the nonlinear Schroedinger equation by a split-step Fourier method will be described.

The nonlinear Schroedinger equation is an equation for determining changes in a waveform when a signal such as light or the like propagates through a nonlinear transmitting medium, and is expressed by following equation (1) if the higher order chromatic dispersion terms are omitted.

$$\partial A/\partial z = j(\beta_2/2)(\partial^2 A/\partial t^2) + \alpha_1 A - j\gamma |A|^2 A \qquad (1)$$

In this equation (1), A is the amplitude of an electric field of the light (amplitude of the envelope), $\beta_2$ is a constant expressing the chromatic dispersion, $\alpha_1$ is a constant expressing loss or gain, and $\gamma$ is a constant expressing the non-linearity.

Here, the above equation (1) can be formally expressed as the following equation (2).

$$\partial A/\partial z = (D^- + N^-)A \qquad (2)$$

$D^-$ is a linear operator expressing dispersion and loss (or gain), and $N^-$ is a nonlinear operator expressing the non-linearity, and they can be respectively shown by the following equations (3a) and (3b).

$$D^- = j(\beta_2/2)(\partial^2 A/\partial t^2) + \alpha_1 \qquad (3a)$$

$$N^- = -j\gamma |A|^2 \qquad (3b)$$

As a method of numerically solving above equation (2), there is the split-step Fourier method. By using this, the amplitude A of the light at the time of propagating a short length h (a length of a degree such that the approximation error in the following equation can be ignored) can be expressed by the following formula (4).

$$A(z+h,t) \approx \exp\{(h/2)D^-\} \exp\{\int^{z \sim z+h} N^-(z')dz'\} \cdot \exp\{(h/2)D^-\}A(z, t) \qquad (4)$$

The symbol $\int^{z \sim z+h}$ expresses the integral until $z'=z \sim z+h$.

By carrying out repeatedly the computation of this equation (4) for the determined length, the amplitude of the electric field of the light propagating the length can be determined.

Here, computation of the chromatic dispersion and loss is carried out by converting to a frequency domain as by the following equation (5).

$$\exp\{(h/2)D^-\} = F^{-1} \exp\{(h/2)D^-(j\omega)\}F \qquad (5)$$

Here, F is an operator expressing a Fourier transformation, and $F^{-1}$ is an operator expressing an inverse Fourier transformation, and these can be calculated by using fast Fourier transformation (FFT).

Further, $D^-(j\omega)$ means that the partial differential operator of the equation (3) is replaced with $j\omega$, and can be calculated by multiplication in the frequency domain.

Note that it is known that the nonlinear coefficient $\gamma$ and the nonlinear refractive index $n_2$ are related by following equation (6).

$$\gamma = n_2 \omega o/(cAeff) \qquad (6)$$

Here, ωo is the angular frequency of the light, c is the light speed, and Aeff is the effective core area of the optical fiber. Because these parameters are already known at the time of measuring and are constants, there is a one-to-one relationship between the nonlinear coefficient γ and the nonlinear refractive index $n_2$, and determining the nonlinear refractive index $n_2$ has the same meaning as determining the nonlinear coefficient γ.

In the aforementioned conventional method, the computation of the above equation (4) is carried out for the pulse light, and the nonlinear refractive index, which makes the time waveform obtained by the calculation and the time waveform obtained by actual measurement coincide, is determined. However, the split-step Fourier method can be applied to a light signal whose intensity is modulated by a sine wave as in this embodiment.

Intensity I of the light, which is intensity-modulated by the modulation signal M having the frequency f and the modulation factor m, is expressed by the following equation (7) when the average power (intensity of non-modulating) is supposed as Io.

$$I=Io[1+m\cos(2\pi ft)] \tag{7}$$

Given that the chirp parameter of the intensity modulator 24 is α, the relationship between a phase φ and the intensity I of the light is expressed by the following equation (8).

$$d\phi/dt=(\alpha/2I)dI/dt \tag{8}$$

Further, the amplitude A of the electric field of the incident light is as per the following equation (9).

$$A=I^{1/2}e^{j\phi(t)} \tag{9}$$

There are many cases in which the chirp of the intensity modulator 24 depends on the intensity I of the modulated light, and when the modulation factor is great, there are cases in which the chirp cannot be considered to be a constant value.

Thus, if the chirp is expressed as α(I) as a function of the intensity I, the phase φ of the light is as per the following equation (10) from the aforementioned equation (8).

$$\phi(I)=\int\{\alpha(I)/2I\}(dI/dt)dt \tag{10}$$

When the equation (7) and the equation (10) are substituted into the equation (9), the amplitude A(0) of the electric field at the fiber incident end (z=0) can be calculated.

Next, calculation of the propagation in the fiber is carried out by the split-step Fourier method.

There are various types of concrete calculating methods of the above equation (4). For example, if it is approximated as:

$$\int^{z-z+h} N^-(z')dz' \approx hN^-(z+h/2)$$

the following equations are obtained.

$$A(z+h/2)\approx F^{-1}\exp\{(h/2)[-j(\beta_2\omega^2/2)+\alpha_1]\}FA(z) \tag{11a}$$

$$A'(z+h/2)\approx \exp\{-jh\gamma|A(z+h/2)|^2\}A(z+h/2) \tag{11b}$$

$$A(z+h)\approx F^{-1}\exp\{(h/2)[-j(\beta_2\omega^2/2)+\alpha_1]\}FA'(z+h/2) \tag{11c}$$

By using above A(0) as an initial value and repeating above equations (11a), (11b) and (11c), an electric field A(L) of the light at the fiber exiting end (z=L) can be determined.

Because a normal photodiode has a square-law detecting characteristic, a component $I_f$ of the frequency f of the electric signal after photoelectric transferring can be determined by the following equation.

$$I_f=|(1/T)\int^{0-T}|A(L)|^2e^{-j2\pi ft}dt| \tag{12}$$

Here, the symbol $\int^{0\sim T}$ expresses the integral of t=0~T, and T is one cycle (1/f) of the sine wave of modulation.

The calculation of the split-step Fourier method may be carried out with respect to one cycle of the sine wave.

In this case, because the cycle of the sine wave can be made to be shorter than the cycle of the pulse wave, there is the advantage that the calculating amount can be small.

Further, if small signal approximation is used instead of the split-step Fourier method, the calculating amount can be made even smaller.

Hereinafter, a computing processing using small signal approximation will be described.

If the amplitude A of the electric field of the incident light is expressed by a Fourier series, it is as per the following equation (13).

$$A=\Sigma^{p=-1\sim 1}A_p e^{j2\pi pft} \tag{13}$$

Here, the symbol $\Sigma^{p=-1\sim 1}$ expresses the sum of p=−1, 0, 1, and p=0 corresponds to the carrier component of the incident light, and p=±1 corresponds to the modulation component of the incident light.

Here, assuming that the modulating factor m is sufficiently small as compared with 1, the respective Fourier coefficients $A_p$ of the amplitude of the electric field of the light incident on the optical fiber 1 are, by the equations (7), (8), (9) and (13) respectively shown by following equations (14a), (14b) and (14c).

$$A_{-1}=(Io)^{1/2}m(1+j\alpha)/4 \tag{14a}$$

$$A_0=(Io)^{1/2} \tag{14b}$$

$$A_1=(Io)^{1/2}m(1+j\alpha)/4 \tag{14c}$$

In the above-described respective equations (14a), (14b) and (14c), To is the power of the light incident on the optical fiber 1, m is the modulation factor, and α is the chirp parameter. If these are already known, the respective Fourier coefficients $A_p$ at p=−1, 0, 1 are already known.

Next, the incident light of the equation (13) is substituted into the Schroedinger equation of the equation (1), and the calculation of propagation in the optical fiber is carried out.

Firstly, the dispersion term of the equation (1) is as per the following equation (15).

$$j(\beta_2/2)(\partial^2 A/\partial t^2)=-j(\beta_2/2)\Sigma^{p=-1\sim 1}(2\pi pf)^2 A_p e^{j2\pi pft} \tag{15}$$

Further, the nonlinear term is obtained by expanding the following equation (16):

$$-j\gamma|A|^2A=-j\gamma(A_0+A_1e^{j2\pi ft}+A_{-1}e^{-j2\pi ft})^2\cdot(A_0^*+A_1^*e^{-j2\pi ft}+A_{-1}^*e^{j2\pi ft}) \tag{16}$$

wherein, A* is a complex conjugate of A.

Here, assuming that the modulation factor m is sufficiently small with respect to 1, $|A_1|$ and $|A_{-1}|$ are sufficiently small with respect to $|A_0|$, and an absolute value of a term obtained by multiplying two or more of $A_1$ or $A_{-1}$ is sufficiently small as compared with the absolute value of a term in which there is one or fewer $A_1$ or $A_{-1}$. The term obtained by expanding the equation (16) can be approximated by ignoring the small term.

Such small signal approximation is carried out, so that the nonlinear term can be approximated as per the following equation (17).

$$-j\gamma|A|^2 A \approx -j\gamma\{|A_0|^2 A_0 + (2|A_0|^2 A_1 + A_0^2 A_{-1}^*)e^{j2\pi ft} + (2|A_0|^2 A_{-1} + A_0^2 A_1^*)e^{-j2\pi ft}\} \quad (17)$$

Therefore, if the chromatic dispersion term of the equation (15) and the nonlinear term of the equation (17) are substituted into the nonlinear Schroedinger equation of the equation (1), it is the following equation (18).

$$\partial A/\partial z = j(\beta_2/2)(\partial^2 A/\partial t^2) + \alpha_1 A - j\gamma|A|^2 A = -j(\beta_2/2)\Sigma^{p=-1}_{-1}(2\pi pf)^2 A_p e^{j2\pi p ft} + \alpha_1 A - j\gamma\Sigma^{p=-1}_{-1} B_p e^{j2\pi p ft} \quad (18)$$

The respective coefficients $B_p$ of the above equation (18) are $$B_0 = |A_0|^2 A_0,$$

$$B_1 = 2|A_0|^2 A_1 + A_0^2 A_{-1}^*,$$

$$B_{-1} = 2|A_0|^2 A_{-1} + A_0^2 A_1^*$$

If the above equation (18) is expressed at each Fourier coefficient, it is as per the following equation (19).

$$\partial A_p/\partial z = -j(\beta_2/2)(2\pi pf)^2 A_p + \alpha_1 A_p - j\gamma B_p|_{p=-1}^{-1} \quad (19)$$

Therefore, $A_p(z+h)$ at propagating the short length h can be approximated by the following equations (20a), (20b) and (20c) for p=−1, 0, 1, respectively.

$$A_p(z+h/2) \approx \exp[(h/2)\alpha_1 - j(h/2)(\beta_2/2)(2\pi pf)^2] A_p(z) \quad (20a)$$

$$A_p'(z+h/2) \approx A_p(z+h/2) - j\gamma h B_p(z+h/2) \quad (20b)$$

$$A_p(z+h) \approx \exp[(h/2)\alpha_1 - j(h/2)(\beta_2/2)(2\pi pf)^2] A_p'(z+h/2) \quad (20c)$$

Note that the result of the equation (20b) can be obtained by substituting in the result of the equation (20a), and the result of the equation (20c) can be obtained by substituting in the result of the equation (20b).

Accordingly, the respective values of the aforementioned equations (14a), (14b) and (14c) for the value of p are considered as initial values at z=0, and by repeatedly calculating the above-equations (20a), (20b) and (20c) for the length L of the optical fiber 1, the amplitude $A_p(L)$ after propagation through the optical fiber 1 can be determined.

Further, as mentioned above, because the photoelectric transducer 30 using photodiodes or the like has a square-law detecting characteristic outputting voltage in proportion to the intensity of the inputted light, the signal component (detected signal M') $I_f$ of the frequency f equal to the modulation signal M, among the electric signals outputted from the photoelectric transducer 30, can be determined by the following equation (21).

$$I_f \approx \Sigma^{|p+q|=1} A_p(L) \cdot A_q(L)^* \quad (21)$$

The symbol $\Sigma^{|p+q|=1}$ expresses the sum of a combination of p and q satisfying |p+q|=1 for p and q of −1, 0, 1.

In this way, if small signal approximation is carried out, it suffices to carry out calculation with respect to the three items of data of p=−1, 0, 1 for $A_p$. Therefore, as compared with a conventional split-step Fourier method, the calculating amount becomes smaller.

The computing section 33 of the present embodiment is for determining, on the basis of the above-described principles, the nonlinear refractive index of the optical fiber 1 to be measured.

Hereinafter, the processing procedures will be describe with reference to the flowchart of FIG. 8.

First, as shown in FIG. 8, the frequency response characteristic (the frequency of the local minimum point as the above predetermined feature value) of the detected signal M' is measured by the frequency response characteristic measuring section 32 (step S1).

Next, the already-known parameters such as the power Io of the incident light, the modulation factor m, the chirp parameter α, constants $\alpha_1$, $\beta_2$, and the like, and a temporary value $n_x$ of the nonlinear refractive index are set (steps S2 and S3).

Next, on the basis of these set parameters, the frequency response characteristic (the above predetermined feature value) of the detected signal M' is calculated by the split-step Fourier method or the above-described small signal approximation (step S4).

Next, it is judged whether or not the frequency response characteristic (the above predetermined feature value) determined by this calculation and the frequency response characteristic (the above predetermined feature value) actually measured at the frequency response characteristic measuring section 32 coincide within a predetermined tolerance range (step S5).

Here, when they do not coincide, the temporary value $n_x$ is changed and the calculation is carried out again, and the operation in which the coincidence is judged is repeated for each calculation (step S6).

Next, it is determined that the temporary value $n_x$ when they coincide is the nonlinear refractive index $n_2$ of the optical fiber 1, and this is outputted to the outputting section 35 (step S7).

To explain more concretely, the frequencies of the local minimum points which are the predetermined feature values on the frequency response characteristic of the detected signal M' are compared, and the temporary value $n_x$ of the nonlinear refractive index is changed such that the difference of the frequencies is within a predetermined range. The temporary value $n_x$ when the difference of the frequencies is within the predetermined range is determined to be the nonlinear refractive index $n_2$ of the optical fiber 1 to be measured, and it is outputted to the outputting section 35 having a display portion (not shown) or the like.

Note that, in the above-described processing, the unknown number is only the nonlinear refractive index, and the chirp parameter and the chromatic dispersion value are already known. Therefore, if there is, as the number of points of measurement, data of at least one point (which does not have to be the frequency of the local minimum point) as the predetermined feature value of the frequency response characteristic obtained at a given power, the nonlinear refractive index can be determined.

Further, with respect to a plurality of data obtained by changing the measuring conditions (for example, the power of the incident light), similar processings are carried out. If a nonlinear refractive index in which a plurality of calculating values coincide the most is determined, the measuring accuracy can be further improved by effect of averaging.

Note that the number of points measurement will be described later.

Further, in the Schroedinger equation of the aforementioned equation (1), the higher-order dispersion term is omitted. However, for example, calculation may be carried out including a third-order chromatic dispersion term, and in accordance therewith, the accuracy is further improved.

As described above, the device 20A for measuring a nonlinear refractive index of an optical fiber according to the present embodiment uses, as measuring light, light which is obtained by intensity-modulating the continuous light outputted from one light source 23 by the modulation signal M of a sine wave. Thus, even if the time waveform is not observed, the power of the measuring light can be accurately calibrated, or the power of the measuring light can be easily and precisely measured by a general power meter, and highly-precise measuring can be carried out.

In the device 20A for measuring a nonlinear refractive index of an optical fiber according to the present embodiment, the nonlinear refractive index is determined by using, as the object of comparison, a predetermined feature value on the frequency response characteristic formed from frequency and amplitude values which can be precisely measured among physical values. Therefore, as compared with a conventional method in which the time waveform of pulse light is used as thee object of comparison, high accuracy can be obtained.

Further, in the device 20A for measuring a nonlinear refractive index of an optical fiber according to the present embodiment, when only the frequency of the local minimum point as a predetermined feature value on the frequency response characteristic is the measuring object and the object of comparison, there is no need to accurately know the value of the detection signal. Therefore, even more highly-accurate measurement can be carried out without being affected by, for example, variation of the characteristics for the modulating frequencies of the photoelectric transducer 30 and the detector 31.

Moreover, in the device 20A for measuring a nonlinear refractive index of an optical fiber according to the present embodiment, by carrying out small signal approximation by utilizing the fact that the modulation factor m is sufficiently small with respect to 1, the computation amount can be made even more small, and the nonlinear refractive index can be computed rapidly.

In the device 20A for measuring a nonlinear refractive index of an optical fiber according to the present embodiment, by using only the frequency of the local minimum point as the predetermined feature value on the frequency response characteristic and by making the modulation factor m small with respect to 1 and carrying out small signal modulation, in addition to the above-described advantage, it is completely unrelated to the value of the modulation factor m. Therefore, it is not influenced by the frequency response characteristics of the sine wave generator 21 and the intensity modulator 24, there is no need to know the value of the modulation factor m, and simple and highly-accurate measurement is possible.

Note that, in the above description, small signal approximation is carried out under the assumption that the modulation factor m is sufficiently small with respect to 1. However, the modulation factor at the time of carrying out actual measurement is a given finite value.

Next, example of the relationship between the modulation factor m and the error of the nonlinear refractive index obtained by small signal approximation will be described.

First, in the measurement conditions shown in following Table 1, the frequency of the local minimum point in a case of carrying out propagation simulation without carrying out small signal approximation is computed.

TABLE 1

| Loss | 0.25 (dB/km) |
| Fiber length | 20 (km) |

TABLE 1-continued

| Effective core area Aeff | $85 \times 10^{-12}$ (m$^2$) |
| Nonlinear refractive index $n_2$ | $2.4 \times 10^{-20}$ (m$^2$/W) |
| Wavelength | 1550 (nm) |
| Chromatic dispersion (@ 1550 mm) | 17 (ps/nm/km) |
| Incident power | 10 (mW) |
| Chirp parameter α | 0 |

Figure 9:
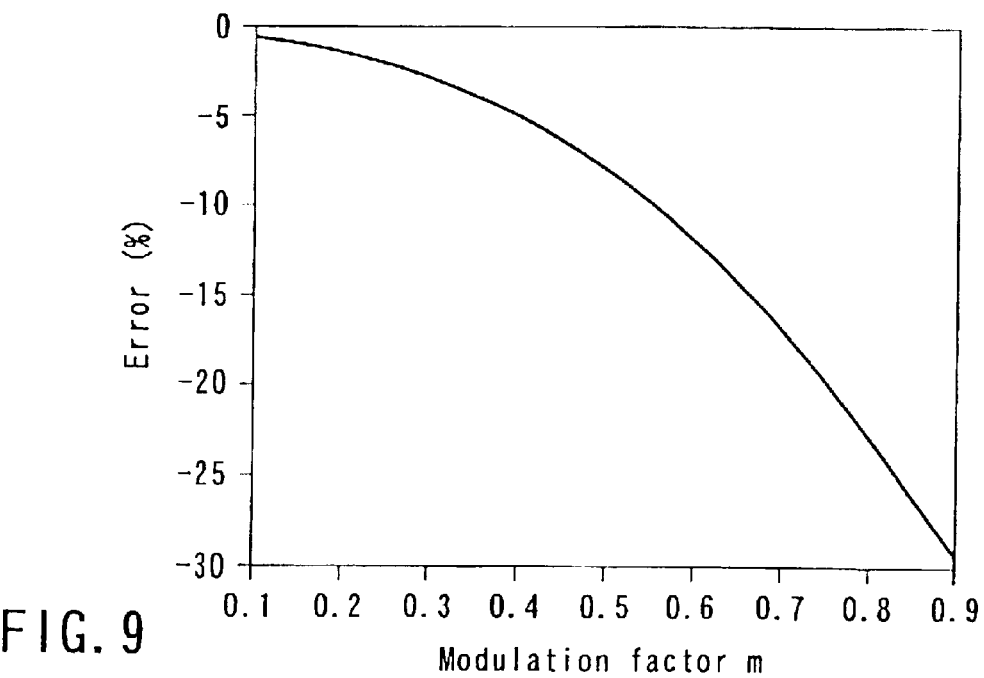
FIG. 9 is a graph showing the relationship between the modulation factor and the error for explaining operation of the device for measuring a nonlinear refractive index of an optical fiber according to the first embodiment of the present invention.

When the frequency of the local minimum point is computed, the effects of FIG. 9 are obtained by making the intensity modulation the ideal sine wave intensity modulation expressed by the above equation (7), by computing the nonlinear refractive index by using the equation of small signal approximation from the computed frequency of the local minimum point, and by determining the error with respect to the true value of the nonlinear refractive index of Table 1 by varying the modulation factor m.

Namely, as is clear from FIG. 9, the smaller the modulation factor m, the smaller the error.

Accordingly, it suffices to determine the modulation factor m in accordance with the error allowed in the measurement. For example, in order to make the error 2% or less, it suffices to set the modulation factor m to be 0.2 or less. This modulation factor m=0.2 is a value which can sufficiently be realized.

In the above-described device 20A for measuring a nonlinear refractive index of an optical fiber, when the frequency chirp and the chromatic dispersion of the intensity modulator 24 are already known. Even when the frequency chirp and the chromatic dispersion are unknown, the nonlinear refractive index, the frequency chirp, and the chromatic dispersion can be determined by the same structure as the above-described device 20 for measuring a nonlinear refractive index of an optical fiber.

In this case, as shown in the flowchart of FIG. 10, the computing section 33, while varying not only the temporary value $n_x$ of the nonlinear refractive index but also the temporary value $\alpha_x$ of the chirp parameter and the temporary value $\beta_x$ of the chromatic dispersion, compares the calculated result and the measured result, and can determine the respective temporary values when the both results coincide in the predetermined range as the nonlinear refractive index, the chirp parameter, and the chromatic dispersion.

Hereinafter, the processing procedures will be described with reference to the flowchart of FIG. 10.

First, as shown in FIG. 10, the frequency response characteristic (frequency of the local minimum point) of the detection signal M is measured by the frequency response characteristic measuring section 32 (step S11).

Next, the already-known parameters such as the power Io of the incident light, the modulation factor m, constants $\alpha_1$, and the like, and a temporary value $n_x$ of the nonlinear refractive index, a temporary value $\alpha_x$ of the chirp parameter, and a temporary value $\beta_x$ of the chromatic dispersion are set (steps S12 and S13).

On the basis of these set parameters, the frequency response characteristic (the above predetermined feature value) of the detected signal M' is determined by calculation by the split-step Fourier method or the above-described small signal approximation (step S14).

Then, it is judged whether or not the frequency response characteristic (the above predetermined feature value) determined by this calculation and the frequency response characteristic (the above predetermined feature value) actually measured at the frequency response characteristic measuring section 32 coincide within a predetermined tolerance range (step S15).

Here, when they do not coincide, the respective temporary values $n_x$, $\alpha_x$, and $\beta_x$ are changed and the calculation is carried out again, and the operation in which the coincidence is judged is repeated for each calculation (step S16).

Next, it is determined that the temporary value $n_x$ when they coincide is the nonlinear refractive index $n_2$ of the optical fiber 1, and this is outputted to the outputting section 35 (step S17).

In this way, when a plurality of parameters are varied, there is a method in which one of the parameters is varied and the difference of the comparison data is made be the least. Thereafter, the next one parameter is varied and the difference of the comparison data is made be the least, and lastly, the remaining parameter is varied.

Further, there is a method in which two parameters are varied and the difference of the comparison data is made be the least, and thereafter, the remaining one is varied, or a method in which all the three parameters are varied and the difference of the comparison data is made be the least.

Note that, in this way, when there are three unknown parameters, it suffices that there are at least three measurement data. In the same way as described above, it may be that the measuring conditions are further changed and much more measurement data are obtained, and the respective parameters are precisely determined.

Further, although unillustrated, when either one of the chirp parameter and the chromatic dispersion is unknown, the nonlinear refractive index and the one parameter can be determined by using at least two measurement data.

In the aforementioned computing section 33, the frequency of the local minimum point determined by calculation and the frequency of the local minimum point obtained by actual measurement are compared, and the temporary value of the nonlinear refractive index is changed such that the difference becomes small. However, as in the flowchart shown in FIG. 11, calculations of the nonlinear propagation with respect to the frequency of the measured local minimum point, namely, calculations of the aforementioned equations (14), (20) and (21), may be carried out, and the temporary value of the nonlinear refractive index may be changed such that the amplitude value of the detected signal M' obtained by the calculation becomes a minimum.

Hereinafter, the processing procedures will be described with reference to the flowchart of FIG. 11.

Figure 11:
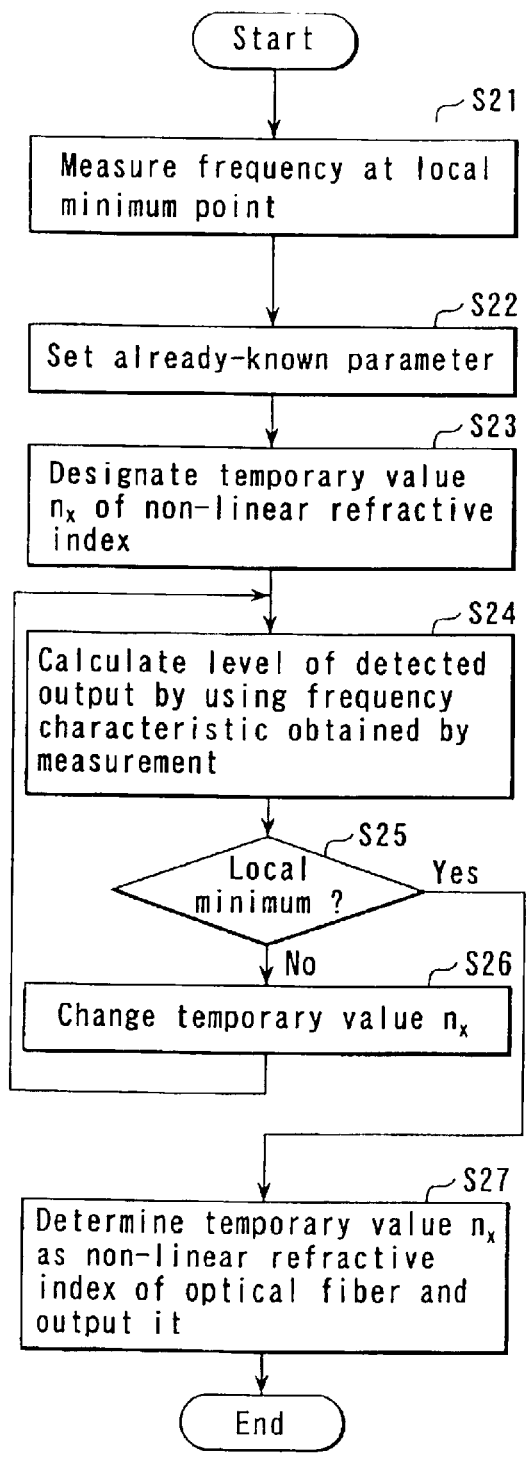
FIG. 11 is a flowchart showing processing procedures of the calculating section for explaining operation of the device for measuring a nonlinear refractive index of an optical fiber according to the first embodiment of the present invention.

First, as shown in FIG. 11, the frequency response characteristic (frequency of the local minimum point as the above predetermined feature value) of the detected signal M' is measured by the frequency response characteristic measuring section 32 (step S21).

Next, the already-known parameters such as the power Io of the incident light, the modulating frequency f of the measured local minimum point, the modulation factor m, the chirp parameter $\alpha$, constants $\alpha_1$, $\beta_2$, and the like, and a temporary value $n_x$ of the nonlinear refractive index are set (steps S22 and S23).

Next, on the basis of these set parameters, the amplitude value of the detected signal M' is calculated by using the frequency f obtained by the measurement (step S24).

In this case, more concretely, the calculation of nonlinear propagation with respect to the frequency of the local minimum point as the predetermined feature value on the frequency response characteristic obtained by measuring, and the amplitude value of the detected signal M' are determined by calculation by the split-step Fourier method or the above-described small signal approximation.

Next, it is judged whether or not the amplitude value determined by this calculation is a local minimum within a predetermined tolerance range (step S25).

Here, when it is not a minimum, the temporary value $n_x$ is changed and the calculation is carried out again, and the operation in which the minimum is judged is repeated for each calculation (step S26).

Next, it is determined that the temporary value $n_x$ when it is judged to be a minimum is the nonlinear refractive index $n_2$ of the optical fiber 1 to be measured, and this is outputted to the outputting section 35 (step S27).

Figure 12:
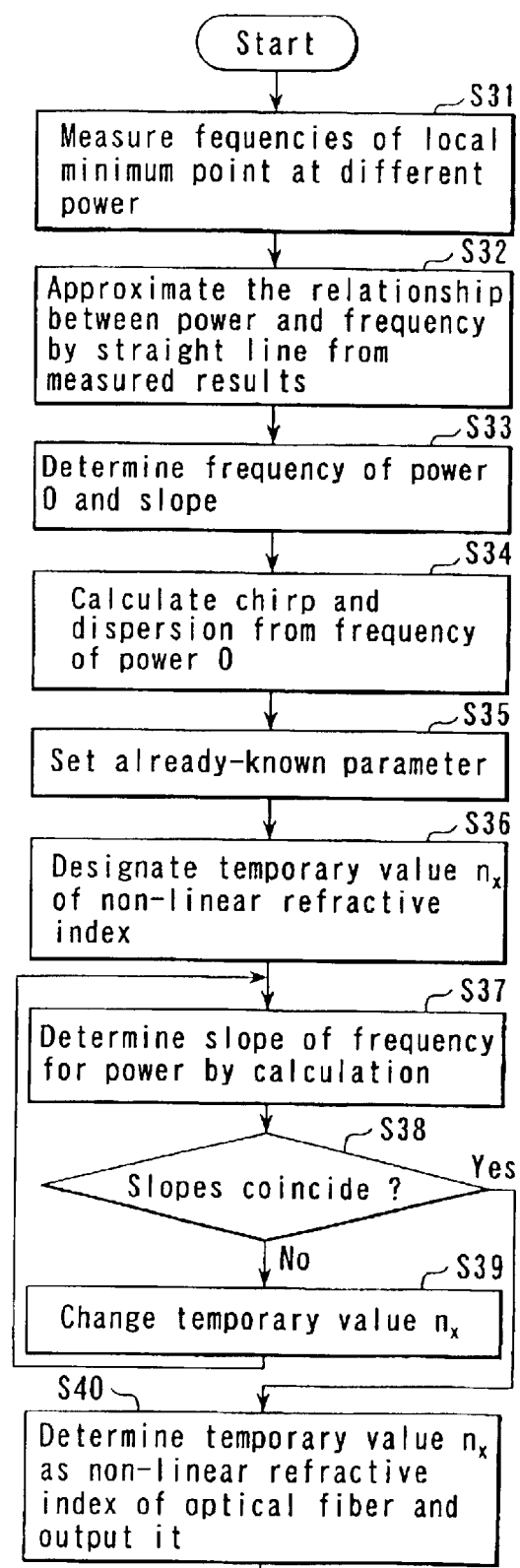
FIG. 12 is a flowchart showing processing procedures of the calculating section for explaining operation of the device for measuring a nonlinear refractive index of an optical fiber according to the first embodiment of the present invention.

Further, as a simple calculating method when the chirp parameter and the dispersion are unknown, the method in accordance with flowchart shown in FIG. 12 can be executed.

Hereinafter, the processing procedures will be described with reference to the flowchart of FIG. 12.

First, as shown in FIG. 12, the frequency of the local minimum point is measured at different powers, for example, the three different powers of P1, P2 and P3 (step S31).

Figure 13:
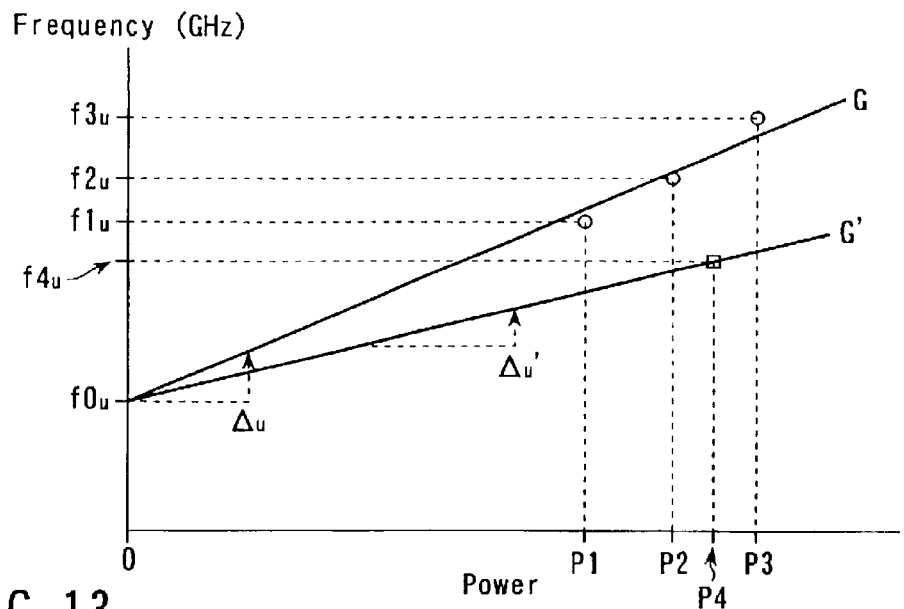
FIG. 13 is a graph shown for explaining operation of the device for measuring a nonlinear refractive index of an optical fiber according to the first embodiment of the present invention.

Next, as shown in FIG. 13, for example, the relationships of the powers and the local minimum frequencies f1$u$, f2$u$ and f3$u$ (called resonance frequencies) of the respective u-th local minimum points obtained by measuring with respect to the three different powers P1, P2 and P3 are approximated by a straight line G by using the method of least squares or the like (step S32).

Then, the straight line G is extended to the frequency axis, and an imaginary resonance frequency f0$u$ at optical power 0 is determined with respect to at least two u's, and the slope $\Delta u$ of the resonance frequency with respect to the optical power is determined for at least one u (step S33).

Further, the chirp parameter $\alpha$ and the chromatic dispersion D are calculated on the basis of the following equation (22) expressing the relationship between the two or more resonance frequencies f0$u$ at the optical power 0, the chromatic dispersion, and the chirp parameter without nonlinear effect (step S34).

Note that, assuming that the light wavelength is $\lambda$, the light speed is c, and the dispersion constant is $\beta_2$, the chromatic dispersion D is expressed by $-2\pi c\beta_2/\lambda^2$.

$$f0u^2L=[c/(2D\lambda^2)][1+2u-(2/\pi)\tan^{-1}\alpha] \qquad (22)$$

The chirp parameter $\alpha$ and the chromatic dispersion D obtained by the above calculation are used, and an already-known parameter is set (step S35). Further, the temporary value $n_x$ of the nonlinear refractive index is set (step S36). The frequency response characteristic with respect to at least one power (for example, P4) is calculated, and as shown in FIG. 13, the slope $\Delta u'$ of the straight line G' connecting the u-th local minimum point frequency f4$u$ and the aforementioned f0$u$ is calculated with respect to at least one u (step S37).

Note that a plurality of powers (for example, P1, P2, P3) may be calculated, and the slope $\Delta u'$ may be determined by straight line approximation.

The temporary value $n_x$ of the nonlinear refractive index is changed in the direction in which the slope $\Delta u'$ calculated in this way and the slope $\Delta u$ obtained by measurement coincide with respect to the each u, and the nonlinear refractive index is determined (steps S38, S39 and S40).

In this case, it suffices for there to be at least one calculated frequency of a local minimum point, and the only changing parameter is the temporary value of the nonlinear refractive index. Therefore, the calculating amount can be made even smaller.

Note that, in this way, the calculating amount is little and the errors are great in the nonlinear refractive index obtained by straight-line-approximating the relationship between the light power and the resonance frequency. Therefore, the nonlinear refractive index obtained by the method of FIG. 12 may be used as the initial value of the temporary value of the nonlinear refractive index, and the computing processing in accordance with the flowcharts shown in FIG. 10 and FIG. 11 can be carried out.

In this case, because the initial value of the temporary value is close to the actual nonlinear refractive index, the number of repetitions of the computing processing in accordance with the flowcharts shown in FIG. 10 and FIG. 11 can be made to be few.

Further, when the nonlinear refractive index is determined, a table is prepared by calculating the relationship between the nonlinear refractive index and the feature value on the frequency response characteristic (the amplitude value or the frequency of the local minimum point) in advance, and the nonlinear refractive index can be determined by using the table previously prepared from the measured value.

Hereinafter, the concrete procedure of this method will be described.

Firstly, the feature value on the frequency response characteristic is calculated on the basis of the nonlinear Schroedinger equation for a given value of the nonlinear refractive index.

Next, such calculation is executed with respect to several values of the nonlinear refractive index, and a table of the nonlinear refractive indices and the feature values on the frequency response characteristic is prepared.

Then, the value of the nonlinear refractive index is determined by interpolating or extrapolating the value of the table from the feature value on the frequency response characteristic measured in actuality.

Note that, because the relationship between the nonlinear refractive index and the feature value on the frequency response characteristic differs in accordance with the chromatic dispersion of the optical fiber, the aforementioned table is prepared in advance with respect to several chromatic dispersion values, and it is possible for the chromatic dispersion to correspond to fibers of various dispersions by interpolating or extrapolating the table.

Next, the number of measurement points required in the method and device for measuring a nonlinear refractive index of an optical fiber of the present invention will be described.

In the method and device for measuring a nonlinear refractive index of an optical fiber of the present invention, basically, it of course suffices for there to be, as the minimum needed number of measurement points, a number of measurement points which is the number of unknown parameters.

However, from the standpoint of measuring accuracy, it is preferably a relationship of the following number of measurement points.

Firstly, when the nonlinear refractive index and the chromatic dispersion are unknown, the change in the frequency response characteristic due to the nonlinear refractive index and the change in the frequency response characteristic due to the chromatic dispersion are different from each other. Therefore, it is preferable to measure the amplitude values at two different modulating frequencies or the frequencies of two different local minimum points.

When the nonlinear refractive index and the chirp parameter are unknown, the change in the frequency response characteristic due to the nonlinear refractive index and the change in the frequency response characteristic due to the chirp parameter are similar, and the effect of the nonlinear refractive index differs in accordance with the optical power. Therefore, it is preferable to measure the amplitude values or the frequencies of local minimum points at two different optical powers.

Further, when the nonlinear refractive index, the chromatic dispersion, and the chirp parameter are unknown, the aforementioned two cases are combined. Therefore, it is preferable to measure the amplitude values or the local minimum points at three points including two different modulation frequencies and two different optical powers.

Summarizing the above results in the relationships shown in following Table 2.

TABLE 2

| Nonlinear refractive index | Chirp parameter | Chromatic dispersion | Minimum measuring point number | Optical power | Modulation frequency |
|---|---|---|---|---|---|
| Unknown | Already-known | Already-known | 1 | 1 | 1 |
| Unknown | Already-known | Unknown | 2 | 1 | 2 |
| Unknown | Unknown | Already-known | 2 | 2 | 1 |
| Unknown | Unknown | Unknown | 3 | 2 | 2 |

(Second Embodiment)

Figure 14:
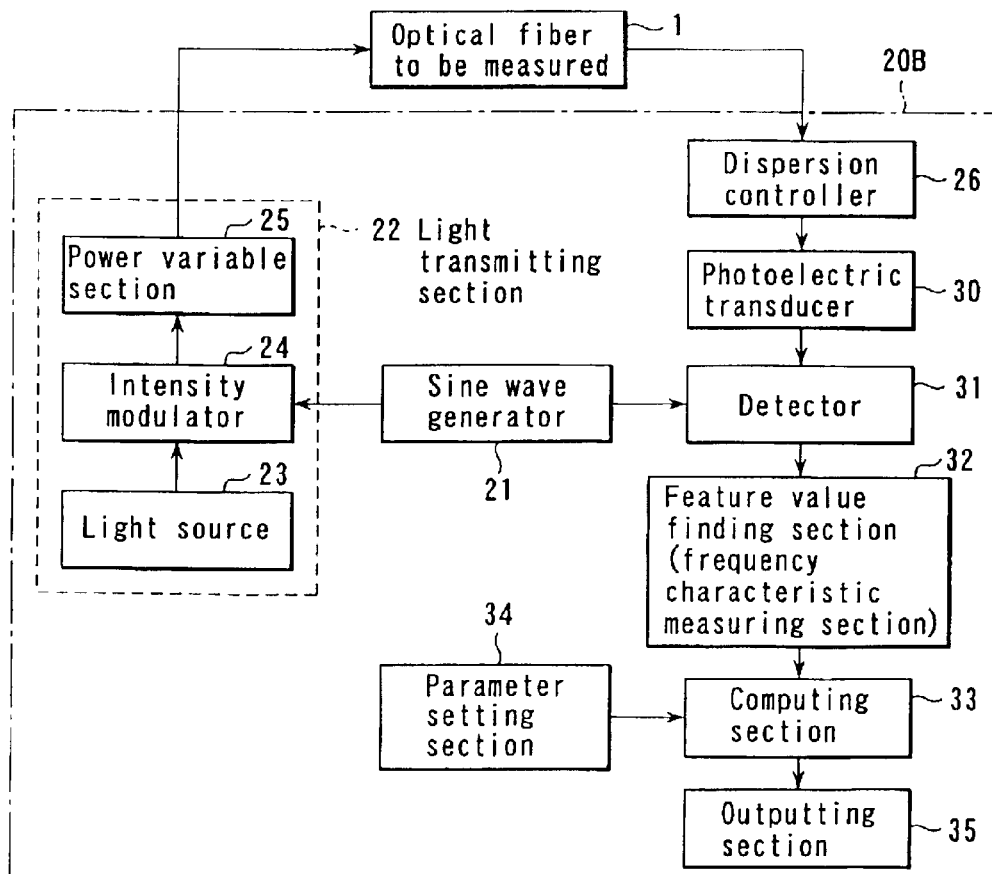
FIG. 14 is a block diagram showing a structure of a device for measuring a nonlinear refractive index of an optical fiber according to a second embodiment of the present invention.

FIG. 14 is a block diagram showing a structure of a device 20B for measuring a nonlinear refractive index of an optical fiber according to a second embodiment of the present invention.

Note that, in the structure shown in FIG. 14, the same reference numerals are given to the same structural bodies as the structural bodies used in the above-described first embodiment, and descriptions thereof will be omitted and only different portions will be described.

In the above-described device 20A for measuring a nonlinear refractive index of an optical fiber according to the first embodiment, the exiting light from the optical fiber 1 to be measured is directly inputted to the photoelectric transducer 30.

However, in this structure, if the chromatic dispersion of the optical fiber 1 to be measured is small, the change in the frequency response characteristic due to the non-linearity is small. Therefore, when an optical fiber, such as a dispersion shifted fiber, having a small chromatic dispersion is measured, there is the need to extremely accurately measure the frequency response characteristic, and it is supposed that measurement is difficult.

Further, in the structure of the above-described device 20A for measuring a nonlinear refractive index of an optical fiber according to the first embodiment, also when the frequency at the local minimum point of the frequency response characteristic is used as the feature value, the frequency at the local minimum point is high if the chromatic dispersion is small. Therefore, there is the need to measure an extremely high frequency, and it is supposed that measurement is difficult.

Thus, in this device 20B for measuring a nonlinear refractive index of an optical fiber according to the second embodiment, in addition to the structure of the above-described device 20A for measuring a nonlinear refractive index of an optical fiber according to the first embodiment, as shown in FIG. 14, it is a structure in which a dispersion controller 26, which effects control such that a chromatic dispersion value between the light transmitter 22 and the photoelectric transducer 30 becomes a chromatic dispersion value suitable for measuring the frequency response characteristic, is added before the photoelectric transducer 30.

Namely, the device 20B for measuring a nonlinear refractive index of an optical fiber according to the second embodiment is a structure in which the exiting light from the optical fiber 1 to be measured is not directly inputted to the photoelectric transducer 30, but the exiting light from the optical fiber 1 to be measured passes through the dispersion controller 26.

In accordance therewith, when the chromatic dispersion of the optical fiber 1 to be measured is small, by making the chromatic dispersion large by the dispersion controller 26, the total chromatic dispersion value is made to be a large value.

In this way, if the total dispersion value is set to be the same, the frequency response characteristic of the fiber to be measured having a small dispersion and the dispersion controller 26 is not exactly the same as in the case of only the fiber to be measured having a large dispersion, but is a characteristic similar thereto.

Accordingly, in the device 20B for measuring a nonlinear refractive index of an optical fiber according to the second embodiment, even when an optical fiber, such as a dispersion shifted fiber, having a small chromatic dispersion is measured, the difficulty of measurement such as in the above-described device 20A for measuring a nonlinear refractive index of an optical fiber according to the first embodiment can be overcome.

Note that, in the device 20B for measuring a nonlinear refractive index of an optical fiber according to the second embodiment, it suffices that the absolute value of the total chromatic dispersion value controlled by the dispersion controller 26 is large, and the total chromatic dispersion value may be either positive or negative.

Next, numerical examples of the total dispersion value to be applied to the device 20B for measuring a nonlinear refractive index of an optical fiber according to the second embodiment will be described.

As described above, when the frequency at the local minimum point is used as a predetermined feature value on the frequency response characteristic, an approximate value of the necessary chromatic dispersion can be estimated by using the equation (22) in the case of a linear form.

For example, given that the wavelength λ=1550 nm, the measuring points of the local minimum points of the frequency response characteristic are two points (u=0, 1), the chirp parameter α=0, and the maximum measurement frequency is about 20 GHz, there is the need for the total dispersion value to be about 470 ps/nm or more.

Next, self calibration will be described.

There is the need for the chromatic dispersion value of the dispersion controller 26 to be applied to the device 20B for measuring a nonlinear refractive index of an optical fiber according to the second embodiment to be known already. Other than a method in which the chromatic dispersion value of the chromatic dispersion controller 26 is measured in advance by another method, self calibration, in which the dispersion value is measured by the present measuring device 20B itself, is possible.

For example, in place of the fiber 1 to be measured, by a method of connecting a short patch fiber which can ignore dispersion and the like or a method of switching by an optical switch, there is a structure in which the dispersion controller 26 is measured when the fiber to be measured is bypassed. Thus, the dispersion of the dispersion controller 26 can be measured by the present measuring device 20B itself.

Further, when the non-linearity of the dispersion controller 26 is large such as with a dispersion compensating fiber, there is the need to also measure the nonlinear refractive index of the dispersion controller 26. The nonlinear refractive index of the dispersion controller 26 as well can be measured by the aforementioned self calibration.

Next, calculating procedures when the dispersion controller 26 is added will be described.

First, after propagation of the light at the fiber to be measured is calculated, propagation of the dispersion controller 26 is calculated, and lastly, calculation of square-law detection by a photodiode used as the photoelectric transducer 30 may be carried out.

Concretely, the equations (20a), (20b) and (20c) are repeatedly calculated for the optical fiber 1 to be measured so as to determine $A_p(L)$, and $A_p(L+L_{DC})$ after passing through the dispersion controller 26 is determined by the following equation derived form the dispersion term of the Schroedinger equation:

$$A_p(L+L_{DC})=\exp[-j(\beta_{2DC}L_{DC}/2)]4\pi^2p^2f^2]A_p(L)$$

wherein, $\beta_{2DC}$ is a constant expressing the chromatic dispersion of the dispersion controller 26, and $L_{DC}$ is the length of a dispersion controller 26.

The detected signal M' is determined by carrying out calculation of a square-law detection of the equation (21) by using $A_p(L+L_{DC})$ instead of $A_p(L)$.

Further, when the non-linearity of the dispersion controller 26 is large as in the case of a dispersion compensating fiber, the effect of the non-linearity of the dispersion controller 26 on the calculated result of the nonlinear refractive index of the optical fiber 1 to be measured can be cancelled by carrying out the calculation including the non-linearity of the dispersion controller 26.

Concretely, the equations (20a), (20b) and (20c) are repeatedly calculated for the optical fiber 1 to be measured and length $A_p(L)$ is determined. Thereafter, during the length $L_{DC}$ and by using the values of loss, chromatic dispersion, and the nonlinear refractive index of the dispersion compensator, $A_p(L+L_{DC})$ is determined by repeatedly calculating the equations (20a), (20b) and (20c) in the same way.

Next, a structural example of the dispersion controller 26 to be applied to the device 20B for measuring a nonlinear refractive index of an optical fiber according to the second embodiment will be described.

In order to correspond to optical fibers to be measured having various of chromatic dispersion values, the chromatic dispersion value of the dispersion controller 26 is preferably variable.

However, since it suffices to make the total dispersion value be within a range suited to measurement of the frequency response characteristic, there is no need to make it always correspond to a constant value.

Thus, it suffices for the dispersion controller 26 to not use a continuous chromatic dispersion value varying method, and the dispersion controller 26 may use a method of discretely varying or a method of switching between several fixed chromatic dispersion values.

Further, when the chromatic dispersion value of the optical fiber 1 to be measured is limited to a fixed range, the dispersion controller 26 may be a fixed dispersion controller having a sufficient total chromatic dispersion in that entire range.

FIGS. 15A to 15D are block diagrams showing concrete examples of the dispersion controller 26 as a structural example of the main portion of FIG. 14.

Figure 15A:
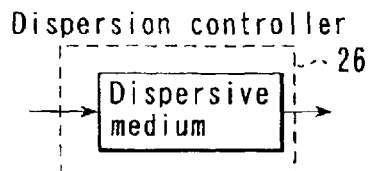
FIGS. 15A to 15D are block diagrams showing a structural example of a main portion of FIG. 14.

FIG. 15A shows the structure of the most simple dispersion controller 26 consisting of a dispersive medium.

When the non-linearity of the dispersive medium is sufficiently small as compared with the fiber to be measured, there are no problems even with such a simple structure. However, when the non-linearity of the dispersive medium cannot be ignored, it is possible to carry out computation including the nonlinear effect of the dispersive medium provided that the loss of the fiber to be measured is already known.

Figure 15B:
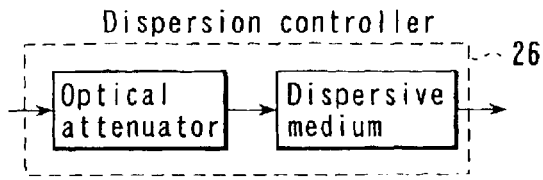

FIG. 15B shows the structure of the dispersion controller 26 comprising an optical attenuator and a dispersive medium.

When there is a large non-linearity at the dispersive medium as with a dispersion compensating fiber, the dispersion controller 26 is structured such that the optical power which is incident on the dispersive medium is made to be small by adding the optical attenuator and the nonlinear effect of the dispersive medium is made to be small.

In this way, even when computation of the nonlinear effect of the dispersive medium is carried out, the effect of the error of the nonlinear refractive index of the dispersive medium can be made small.

Figure 15C:
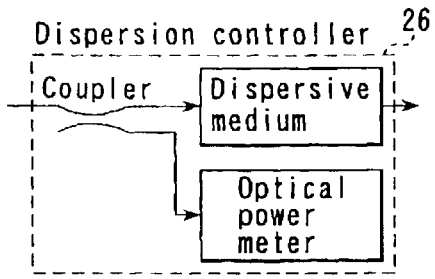

FIG. 15C shows a structure of the dispersion controller 26 comprising an optical power meter and a dispersive medium.

In this dispersion controller 26, light divided by a coupler is measured by an optical power meter, and the values of the exiting light power of the fiber to be measured and the incident light power of the dispersive medium can be obtained (by correcting the loss of the coupler).

In accordance therewith, the loss of the fiber to be measured can be obtained, and even when the loss of the fiber to be measured is unknown, calculation of the nonlinear effect of the dispersive medium can be carried out.

Figure 15D:
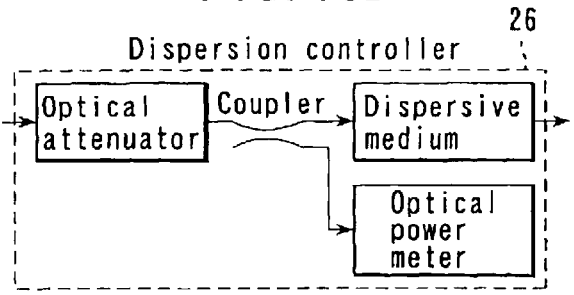

FIG. 15D is a structure of the dispersion controller 26 comprising the optical attenuator, the optical power meter, and the dispersive medium.

The dispersion controller 26 is a structure combining the dispersion controllers 26 shown in FIG. 15B and FIG. 15C, and has features of both.

Namely, even when the loss of the fiber to be measured is unknown, it is possible to calculate the nonlinear effect of the dispersive medium, and the effect of the error of the nonlinear refractive index of the dispersive medium can be made small.

Note that, the order of connection of the optical attenuator and the optical power meter may be reversed.

Next, an example of the dispersive medium will be described.

Examples of the dispersive medium used here are various types of devices (for example, an optical fiber having a large chromatic dispersion such as a single mode fiber or a dispersion compensating fiber, a fiber bragg grating, a virtually imaged phased array (VIPA)) generally used in dispersion compensators.

(Third Embodiment)

Figure 16:
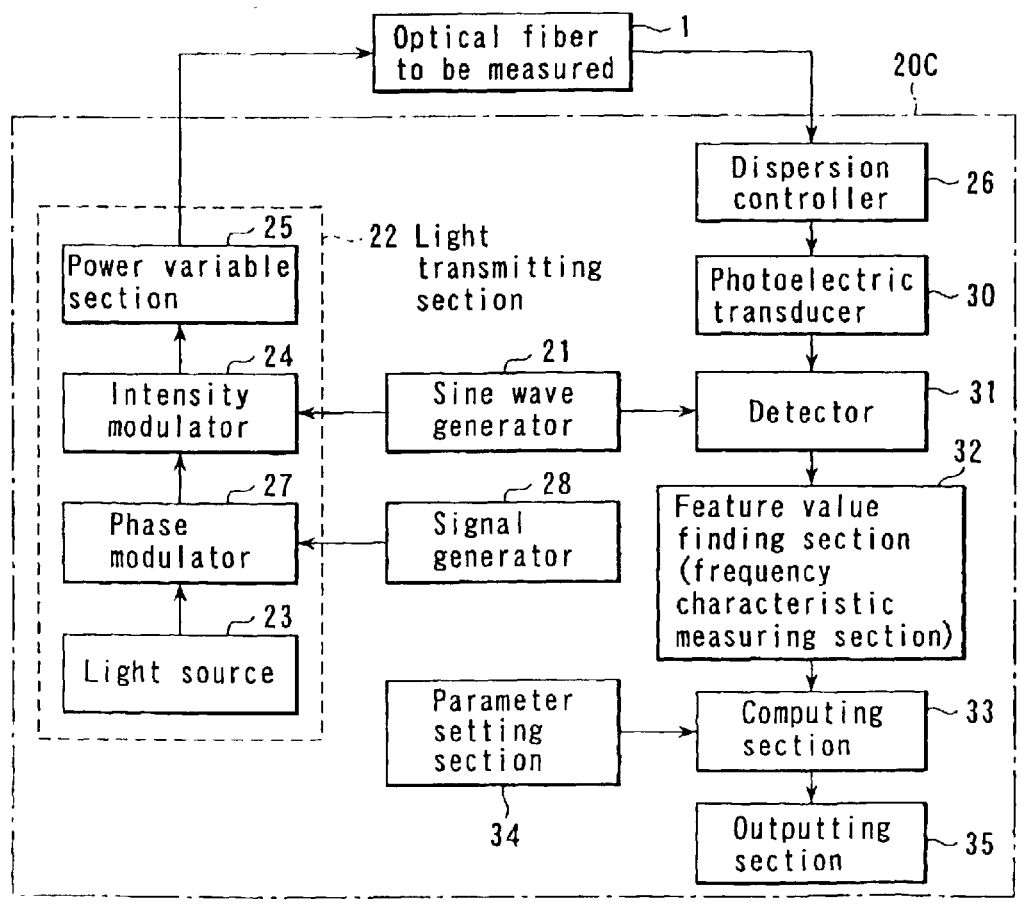
FIG. 16 is a block diagram showing a structure of a device for measuring a nonlinear refractive index of an optical fiber according to a third embodiment of the present invention.

FIG. 16 is a block diagram showing a structure of a device 20C for measuring a nonlinear refractive index of an optical fiber according to a third embodiment of the present invention.

Note that, in the structure shown in FIG. 16, the same reference numerals are given to the same structural bodies as the structural bodies used in the above-described first and second embodiments, and descriptions thereof will be omitted and only different portions will be described.

In measurement of the nonlinear refractive index of the optical fiber, the greater the power of input light to the optical fiber to be measured, the greater the nonlinear effect. Therefore, because the measuring error relatively decreases, it is preferable to measure by using a light power which is as large as possible.

However, if the light power is larger than the Brillouin threshold value, a Stokes wave advancing in the opposite direction arises due to stimulated Brillouin scattering, and the substantial fiber incident power decreases. Therefore, the nonlinear effect becomes small, and measuring errors arise.

Therefore, in measurement of the nonlinear refractive index of the optical fiber, the power of input light to the optical fiber to be measured is limited to a light power less than the Brillouin threshold value.

In this case, it is known that the Brillouin threshold value depends on the spectral line width of the light source, and if the spectral line width is narrow, the threshold value becomes small.

On the other hand, in measurement of the nonlinear refractive index of the optical fiber by small signal modulation, there is hardly any increase of the line width due to the modulation, and the Brillouin threshold value is small and the light power is limited.

Thus, in the device 20C for measuring a nonlinear refractive index of an optical fiber according to the third embodiment, as shown in FIG. 16, a phase modulator 27 is provided between the light source 23 and the intensity modulator 24 at the light transmitting section 22.

Further, the Brillouin threshold value is made large by adding phase modulation of a large signal from a signal generator 28 by the phase modulator 27 to increase the line width, the power of the incident light to the fiber 1 to be measured can be increased, and measuring errors can be decreased.

Here, because the phase modulation by the phase modulator 27 is for increasing the spectral line width, the modulating signal for use in the phase modulation from the signal generator 28 may be a signal having band corresponding to the increased spectral line width.

However, the phase modulation by the phase modulator 27 preferably uses, as the modulating signal of the phase modulation, a sine wave different from 1/integer of the modulation frequency of the intensity modulation by the intensity modulator 24 or a repeating signal of a frequency corresponding thereto, because the effect on the measurement using the intensity modulation is small.

Further, in the phase modulation by the phase modulator 27, because the effect on the measurement using the intensity modulation is large if the modulation index of the phase modulation is large, the modulation index is preferably a modulation index which is needed and sufficient for suppressing the stimulated Brillouin scattering.

Note that the order of the phase modulation by the phase modulator 27, the intensity modulation by the intensity modulator 24, and the power variation by the power variable section 25 are arbitrary, and, in any order, the signals incident on the fiber 1 to be measured are the same.

Figure 17:
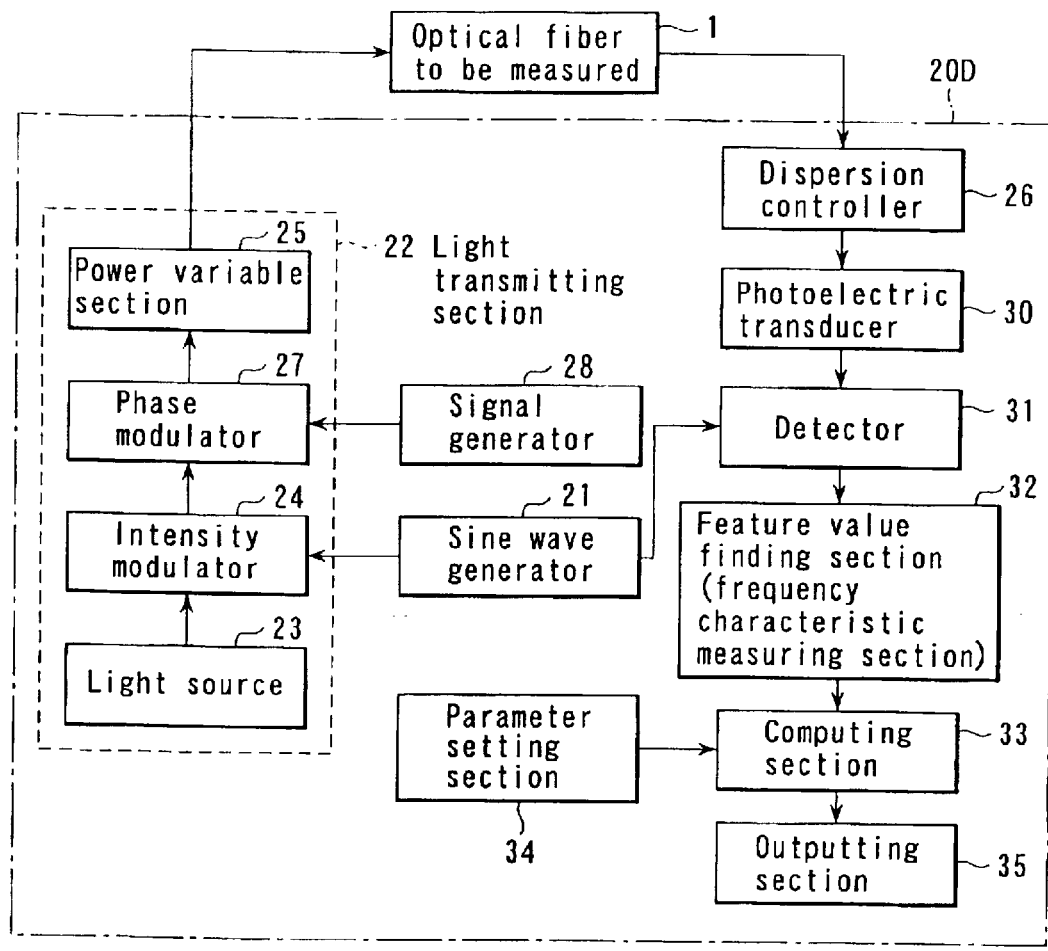
FIG. 17 is a block diagram showing a structure of a device for measuring a nonlinear refractive index of an optical fiber according to a modified example of the third embodiment of the present invention.
Figure 18:
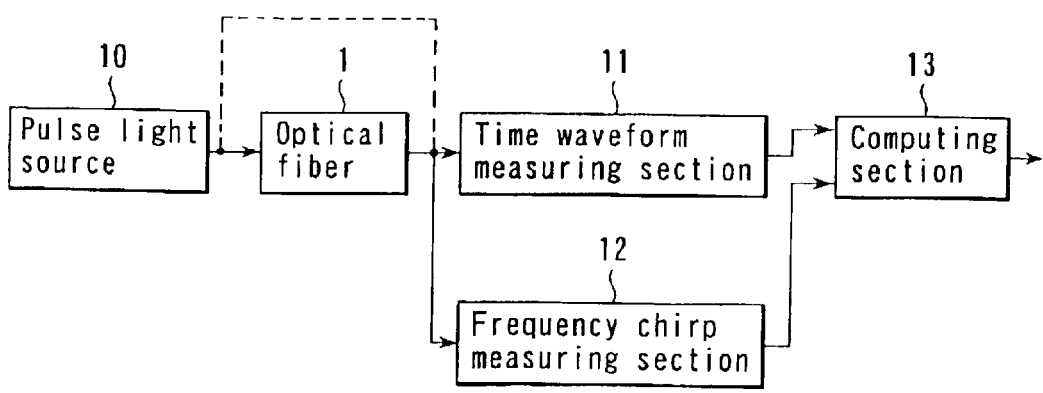
FIG. 18 is a block diagram showing a structure of a device for measuring a nonlinear refractive index of an optical fiber in accordance with a prior art.

FIG. 17 is a block diagram showing a structure of a device 20D for measuring a nonlinear refractive index of an optical fiber according to a modified example of the third embodiment.

Namely, in the device 20D for measuring a nonlinear refractive index of an optical fiber according to the third embodiment, as shown in FIG. 17, the phase modulator 27 is provided between the intensity modulator 24 and the power variable section 25 at the light transmitting section 22. The Brillouin threshold value is made large by adding phase modulation of a large signal from the signal generator 28 by the phase modulator 27 to increase the spectral line width, so that the power of the incident light on the fiber 1 can be increased, and measuring errors can be decreased.

Note that, in the structures of FIG. 16 and FIG. 17, the dispersion controller 26 used in the above-described second embodiment is used for both. However, in the same way as in the first embodiment, they may be structures in which the dispersion controller 26 is omitted.

As described above, in the method and device for measuring a nonlinear refractive index of an optical fiber of the present invention, the light obtained by intensity-modulating, by a modulation signal of a sine wave, and phase-modulating the continuous light outputted from one light source is used as the measuring light. Therefore, the power can be accurately calibrated or can be easily and precisely measured by a general power meter without observing the time waveform, and highly-precise measurement can be carried out.

In the method and device for measuring a nonlinear refractive index of an optical fiber of the present invention, because it suffices to carry out calculation with respect to the sine wave, a small calculating amount is sufficient. Further, the nonlinear refractive index is determined by using, as the measurement object, the frequency response characteristic formed from the frequencies and levels which can be precisely measured among the physical amounts. Therefore, as compared with the conventional method in which the time waveform of the pulse light is used as the measurement object, high measurement accuracy can be obtained.

Further, in the method and device for measuring a nonlinear refractive index of an optical fiber of the present invention, when the modulation factor is sufficiently small with respect to 1, and the frequency at the local minimum point is the measurement object of the frequency response characteristic of the extracted signal, there is no need for an accurate value of the modulation factor and the extracted signal amplitude. Therefore, even more highly-precise measurement can be carried out without being affected by variation and the like of the characteristic with respect to the modulating frequency of the sine-wave generator, the intensity modulator, the photoelectric transducer, and the detector.

Furthermore, in the method and device for measuring a nonlinear refractive index of an optical fiber of the present invention, by carrying out small signal approximation with respect to the modulation signal, it suffices that the calculating amount is extremely little, and the nonlinear refractive index can be rapidly determined. Further, because it is based on the nonlinear Schroedinger equation including the chromatic dispersion term, even a case in which the chromatic dispersion of the optical fiber is large can be handled.

In addition, in the method and device for measuring a nonlinear refractive index of an optical fiber of the present invention, even when the chromatic dispersion of the optical fiber and the chirp parameter of the intensity modulator are unknown, the chromatic dispersion of the optical fiber and the chirp parameter can be determined simultaneously with the measurement of the nonlinear refractive index of the optical fiber.

In the method and device for measuring a nonlinear refractive index of an optical fiber of the present invention, by controlling the total chromatic dispersion value by the dispersion controller 26, even when an optical fiber, such as a dispersion shifted fiber, having a small chromatic dispersion is measured, the measurement of the nonlinear refractive index of the optical fiber can be easily carried out.

Further, in the method and device for measuring a nonlinear refractive index of an optical fiber of the present invention, the Brillouin threshold value is made large by adding phase modulation of a large signal from the signal generator 28 by the phase modulator 27 to increase the spectral line width, thereby the power of the incident light on the fiber can be increased, and measuring errors can be decreased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of measuring a nonlinear refractive index of an optical fiber, said method comprising:

inputting light, an intensity of which is modulated by a modulation signal of a sine wave having a designated frequency, to one end side of an optical fiber which is a measurement object;

converting the light which is incident on the one end side of the optical fiber that is the measurement object and which exits from the other end side of the optical fiber that is the measurement object into an electric signal, and finding, from the electric signal, a predetermined feature value of a signal component having a frequency equal to the frequency of the modulation signal; and obtaining a nonlinear refractive index of the optical fiber that is the measurement object from the predetermined feature value by calculation based on a nonlinear Schroedinger equation.

2. A method of measuring a nonlinear refractive index of an optical fiber according to claim 1, wherein:

the finding of the predetermined feature value includes measuring a frequency response characteristic of the signal component as the predetermined feature value.

3. A method of measuring a nonlinear refractive index of an optical fiber according to claim 1, wherein:

the finding of the predetermined feature value includes measuring, as the predetermined feature value, one of:
(i) an amplitude value of the signal component at a predetermined frequency and (ii) a frequency at which the amplitude value of the signal component becomes a local minimum.

4. A method of measuring a nonlinear refractive index of an optical fiber according to claim 1, wherein the obtaining of the nonlinear refractive index includes:

determining coincidence of the predetermined feature value and a feature value, in calculation corresponding to the predetermined feature value, wherein the coincidence is obtained by successively changing a temporary value of the nonlinear refractive index of the optical fiber that is the measurement object and by entering the temporary value in a nonlinear Schroedinger equation.

5. A method of measuring a nonlinear refractive index of an optical fiber according to claim 1, wherein the obtaining of the nonlinear refractive index includes:

first computing the predetermined feature value of the signal component based on the nonlinear Schroedinger equation for values of several nonlinear refractive indices;

preparing a table showing a relationship between the several nonlinear refractive indices and the predetermined feature value of the signal component by the first computing; and second computing the nonlinear refractive index of the optical fiber that is the measurement object by interpolating or extrapolating a value of the prepared table by using the predetermined feature value of the signal component.

6. A method of measuring a nonlinear refractive index of an optical fiber according to claim 5, wherein:

the preparing of the table includes preparing relationships between the several nonlinear refractive indices and the predetermined value of the signal component into the table with respect to several chromatic dispersion values of optical fibers, and the chromatic dispersion values are corresponded to fibers of various dispersions by computing the nonlinear refractive index of the optical fiber that is the measurement object by interpolating or extrapolating the table by the chromatic dispersion value of the optical fiber that is the measurement object.

7. A method of measuring a nonlinear refractive index of an optical fiber according to claim 1, further comprising:

between the inputting of the light and the converting of the light, controlling chromatic dispersion to become a chromatic dispersion value appropriate for the finding of the predetermined feature value for the light which is incident on the one end side of the optical fiber that is the measurement object and which exits from the other end side of the optical fiber that is the measurement object.

8. A method of measuring a nonlinear refractive index of an optical fiber according to claim 7, wherein:

the inputting of the light includes applying phase modulation to the light which is to be incident on the one end side of the optical fiber that is the measurement object, before or after intensity modulation by the modulation signal of the sine wave.

9. A method of measuring a nonlinear refractive index of an optical fiber according to claim 1, wherein:

the inputting of the light includes applying phase modulation to the light which is to be incident on the one end side of the optical fiber that is the measurement object, before or after intensity modulation by the modulation signal of the sine wave.

10. A method of measuring a nonlinear refractive index of an optical fiber according to claim 1, wherein:

the obtaining of the nonlinear refractive index includes performing small signal approximation with respect to the modulation signal of the sine wave.

11. A device for measuring a nonlinear refractive index of an optical fiber, said device comprising:

a light transmitting section which makes light, the intensity of which is modulated by a modulating signal of a sine wave having a designated frequency, incident on one end side of an optical fiber which is a measurement object;

a feature value determining section which converts the light, which is incident on one end side of the optical fiber that is the measurement object and exits from another end side of the optical fiber that is the measurement object, into an electric signal, and finds, from the electric signal, a predetermined feature value of a signal component having a frequency equal to the frequency of the modulation signal; and a computing section which obtains a nonlinear refractive index of the optical fiber that is the measurement object from the predetermined feature value by calculation based on a nonlinear Schroedinger equation.

12. A device for measuring a nonlinear refractive index of an optical fiber according to claim 11, wherein:

the feature value determining section includes a frequency response characteristic measuring section which measures a frequency response characteristic of the signal component as the predetermined feature value.

13. A device for measuring a nonlinear refractive index of an optical fiber according to claim 11, wherein:

the feature value determining section includes a frequency response characteristic measuring section which measures, as the predetermined feature value, one of:
(i) an amplitude value of the signal component at a predetermined frequency and (ii) a frequency at which the amplitude value of the signal component becomes a local minimum.

14. A device for measuring a nonlinear refractive index of an optical fiber according to claim 11, wherein:

the computing section determines coincidence of the predetermined feature value found by the feature value determining section and a feature value, in calculation corresponding to the predetermined feature value, wherein the coincidence is obtained by successively changing a temporary value of the nonlinear refractive index of the optical fiber that is the measurement object and by entering the temporary value in a nonlinear Schroedinger equation.

15. A device for measuring a nonlinear refractive index of an optical fiber according to claim 11, wherein the computing section:

first computes the predetermined feature value of the signal component based on the nonlinear Schroedinger equation for values of several nonlinear refractive indices;

prepares a table showing a relationship between the computed several nonlinear refractive indices and the predetermined feature value of the signal component; and second computes the nonlinear refractive index of the optical fiber that is the measurement object by interpolating or extrapolating the value of the table by using the predetermined feature value of the signal component measured by the feature value determining section.

16. A device for measuring a nonlinear refractive index of an optical fiber according to claim 15, wherein:

the table is prepared for the relationships between the several nonlinear refractive indices and the predetermined value of the signal component with respect to several chromatic dispersion values of optical fibers; and the chromatic dispersion values are corresponded to fibers of various dispersions by computing the nonlinear refractive index of the optical fiber that is the measurement object by interpolating or extrapolating the table by the chromatic dispersion value of the optical fiber that is the measurement object.

17. A device for measuring a nonlinear refractive index of an optical fiber according to claim 11, further comprising:

a dispersion controlling section which controls chromatic dispersion to become chromatic dispersion value appropriate for the predetermined feature value for the light exiting from the other end side of the optical fiber that is the measurement object.

18. A device for measuring a nonlinear refractive index of an optical fiber according to claim 17, wherein:

the light transmitting section includes a phase modulating section which applies phase modulation to the light which is to be incident on the one end side of the optical fiber that is the measurement object, before or after intensity modulation by the modulation signal of the sine wave.

19. A device for measuring a nonlinear refractive index of an optical fiber according to claim 11, wherein:

the light transmitting section includes a phase modulating section which applies phase modulation to the light which is to be incident on the one end side of the optical fiber that is the measurement object, before or after intensity modulation by the modulation signal of the sine wave.

20. A device for measuring a nonlinear refractive index of an optical fiber according to claim 11, wherein:

the computing section performs small signal approximation with respect to the modulating signal of the sine wave.

* * * * *